United States Patent
Sharp et al.

(10) Patent No.: US 7,088,261 B2
(45) Date of Patent: Aug. 8, 2006

(54) TRAFFIC SIGNAL LIGHT HAVING AMBIENT LIGHT DETECTION

(75) Inventors: Frank M. Sharp, Dallas, TX (US);
Arthur D. Heald, Plano, TX (US);
Michael J. Zalta, Richardson, TX (US)

(73) Assignee: Lailai Capital Corp., City of Industry, CA (US)

( * ) Notice: Subject to any disclaimer, the term of this patent is extended or adjusted under 35 U.S.C. 154(b) by 133 days.

(21) Appl. No.: 10/922,533

(22) Filed: Aug. 20, 2004

(65) Prior Publication Data

US 2005/0030203 A1    Feb. 10, 2005

Related U.S. Application Data

(63) Continuation-in-part of application No. 10/643,135, filed on Aug. 18, 2003, now Pat. No. 6,888,474, which is a continuation-in-part of application No. 09/649,661, filed on Aug. 29, 2000, now Pat. No. 6,614,358.

(60) Provisional application No. 60/514,991, filed on Oct. 28, 2003.

(51) Int. Cl.
*G08G 1/095* (2006.01)

(52) U.S. Cl. .............. 340/907; 340/815.4; 340/815.45; 340/815.75; 362/609; 362/245; 362/296

(58) Field of Classification Search ................ 340/907, 340/815.4, 815.45, 815.55, 815.75; 362/606, 362/609, 611, 612, 84, 245, 296, 341
See application file for complete search history.

(56) References Cited

U.S. PATENT DOCUMENTS

| | | | | |
|---|---|---|---|---|
| 5,132,682 A * | 7/1992 | Higgins et al. | ............ | 340/931 |
| 5,309,155 A * | 5/1994 | Hsien et al. | ................ | 340/907 |
| 5,633,629 A * | 5/1997 | Hochstein | ................... | 340/907 |
| 5,806,969 A * | 9/1998 | Rosengren | ................... | 362/235 |
| 6,283,613 B1 * | 9/2001 | Schaffer | ..................... | 362/245 |
| 6,323,781 B1 * | 11/2001 | Hutchison | ................ | 340/815.4 |
| 6,426,704 B1 * | 7/2002 | Hutchison | ................ | 340/693.5 |
| 6,441,750 B1 * | 8/2002 | Hutchison | ................... | 340/907 |
| 6,450,662 B1 * | 9/2002 | Hutchison | ................... | 362/246 |
| 6,577,247 B1 * | 6/2003 | Giacaman | ................... | 340/907 |

* cited by examiner

*Primary Examiner*—Toan N. Pham
(74) *Attorney, Agent, or Firm*—Jackson Walker LLP

(57) ABSTRACT

A traffic signal (310) having a reflector (322, 400) having a plurality of reflective surfaces (330, 402) directing incident ambient light received from the signal lens (318) to a photodetector (322). The reflector is disposed proximate and about a plurality of LEDs (324, 406) which are pulse width modulated by an integrated controller (360) to generate light which is also transmitted through the lens. The photodetector senses the incoming ambient light when the LEDs are in the "off" mode. Incident ambient light is focused by a lens to overfill the reflector and LEDs, and the photodetector is positioned within the redirected incident ambient light from the lens.

33 Claims, 26 Drawing Sheets

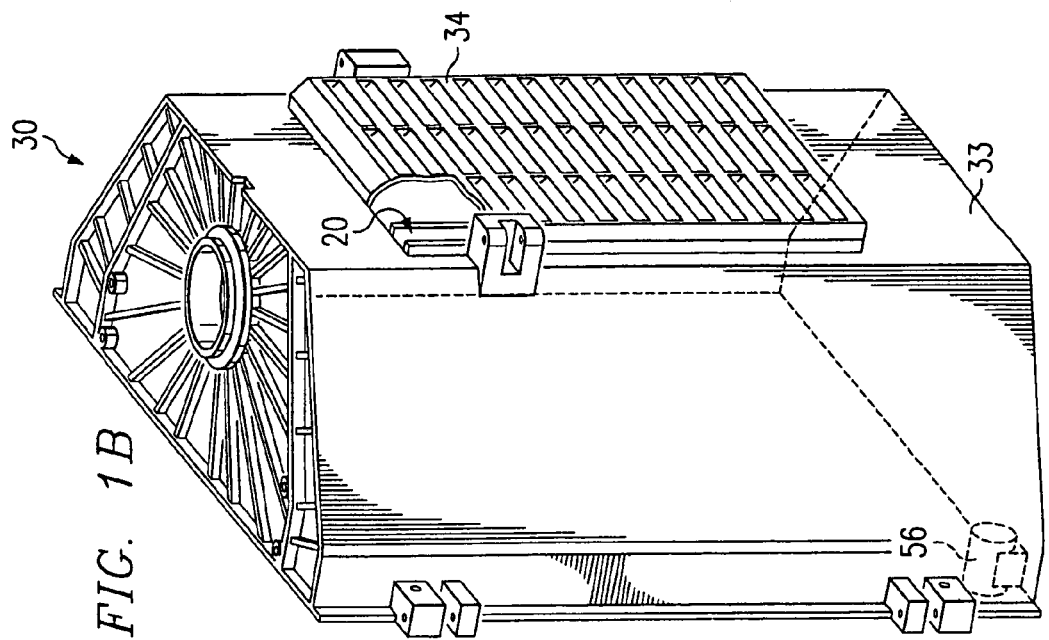
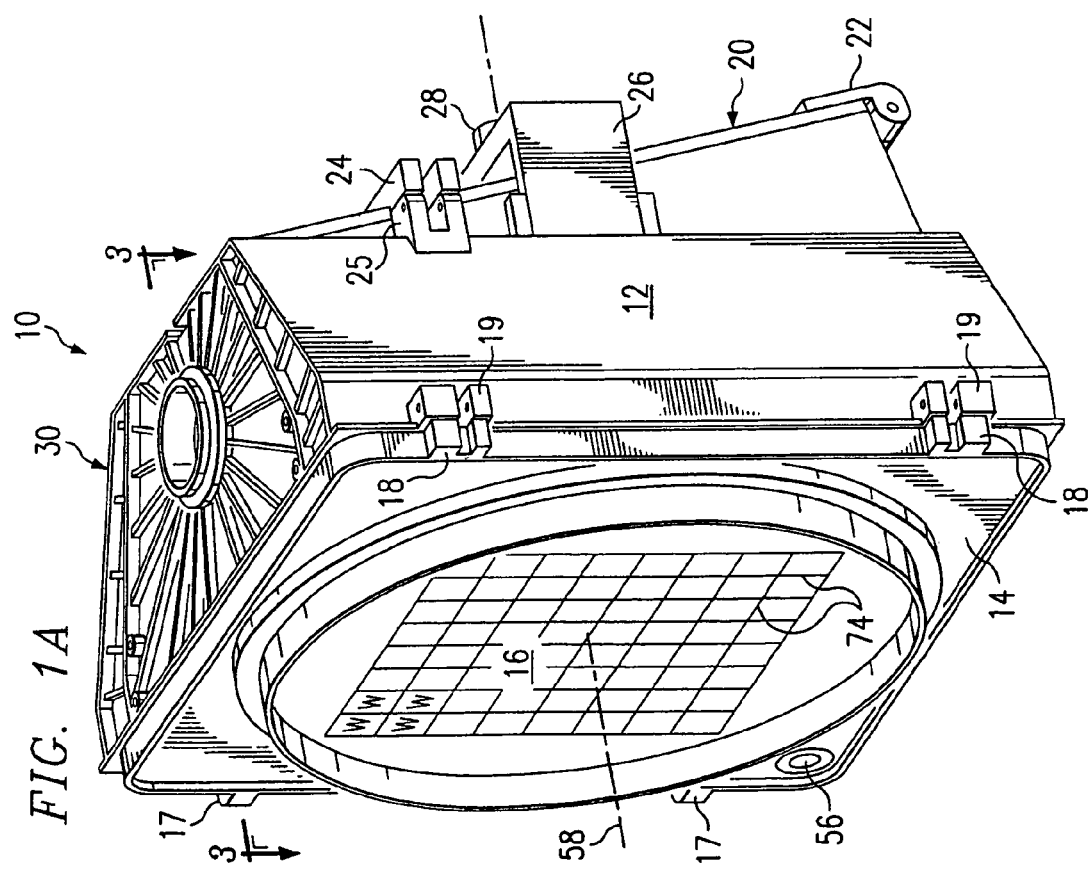

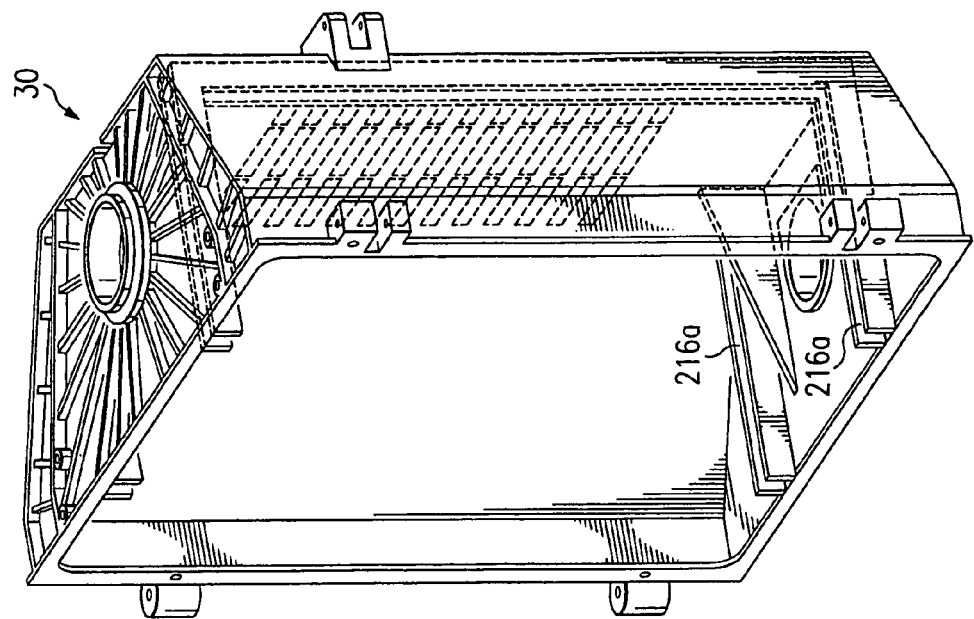
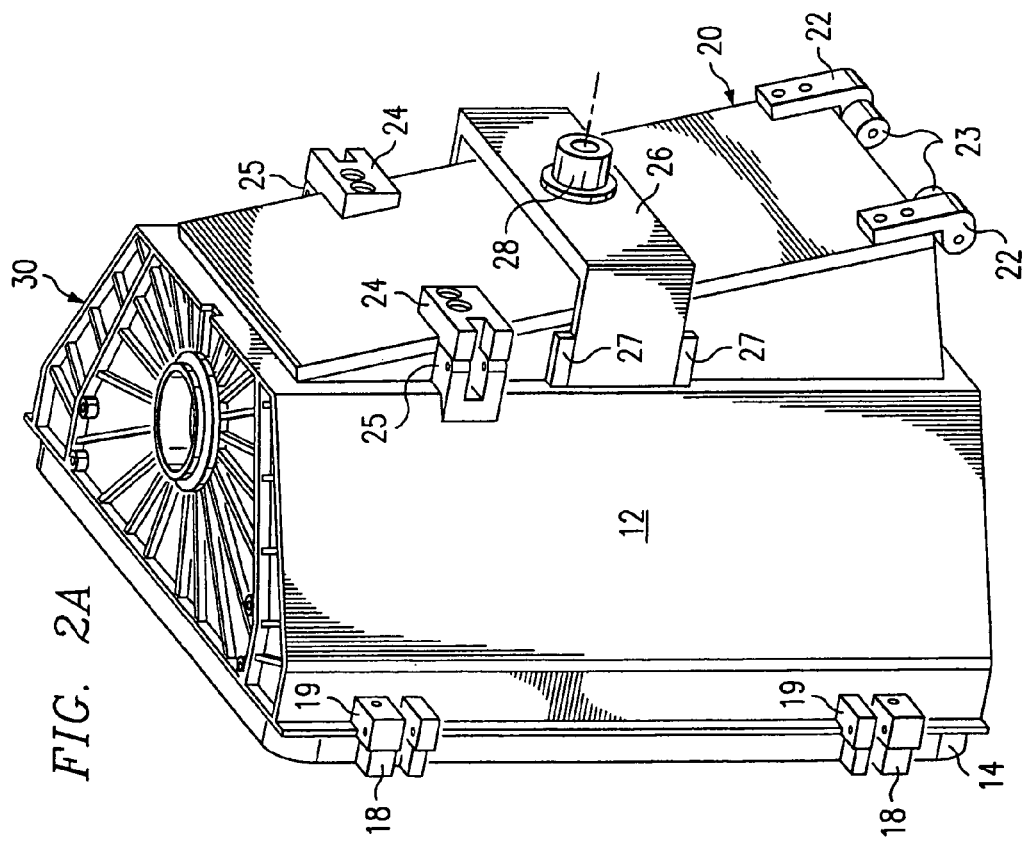

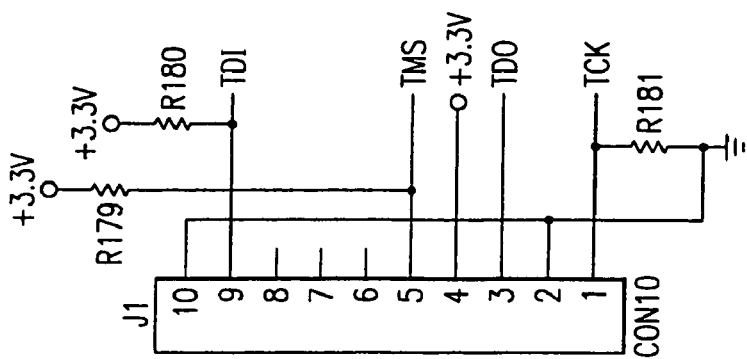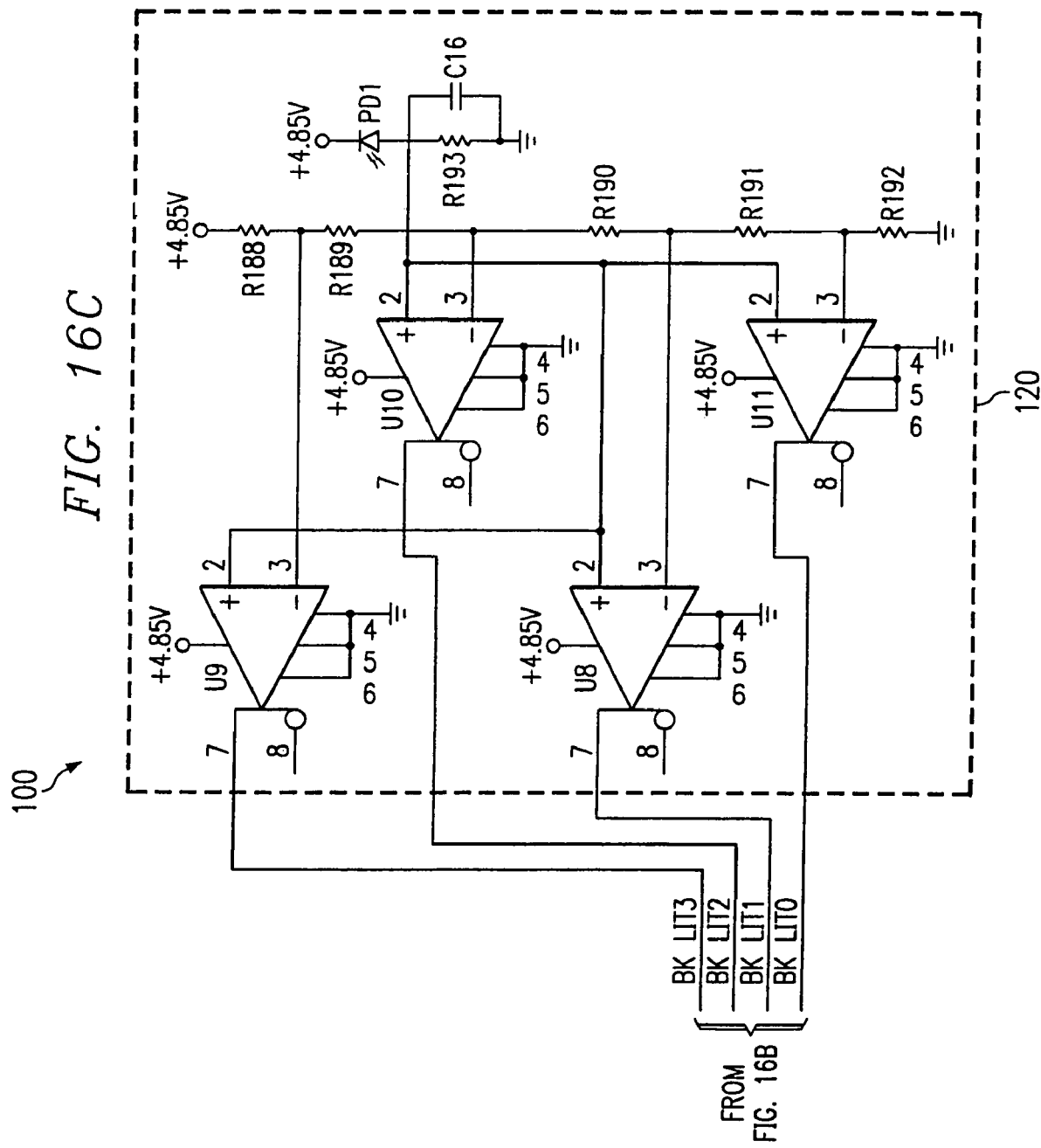
FIG. 16C

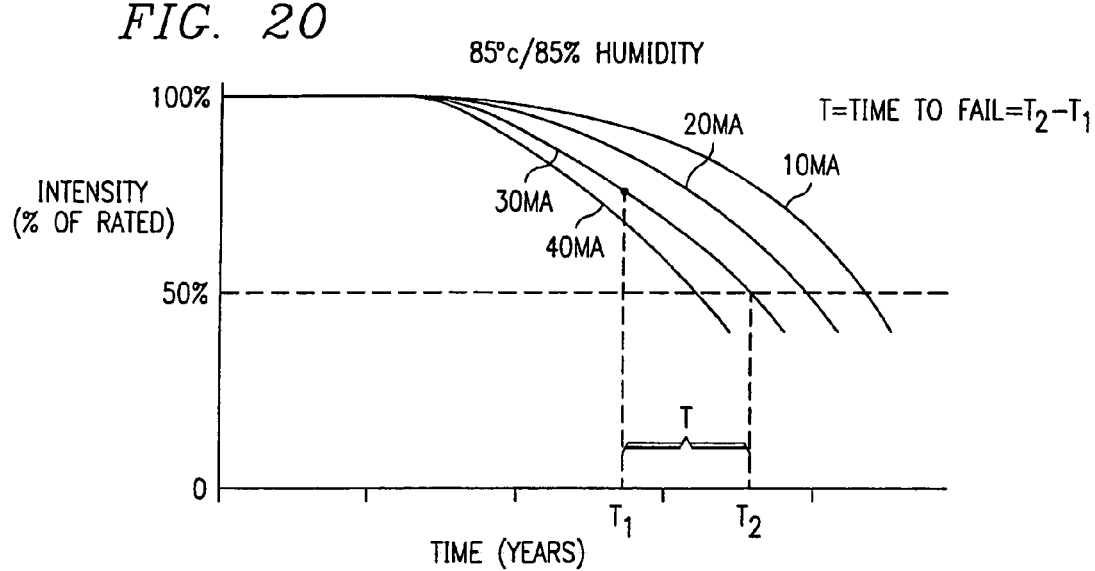
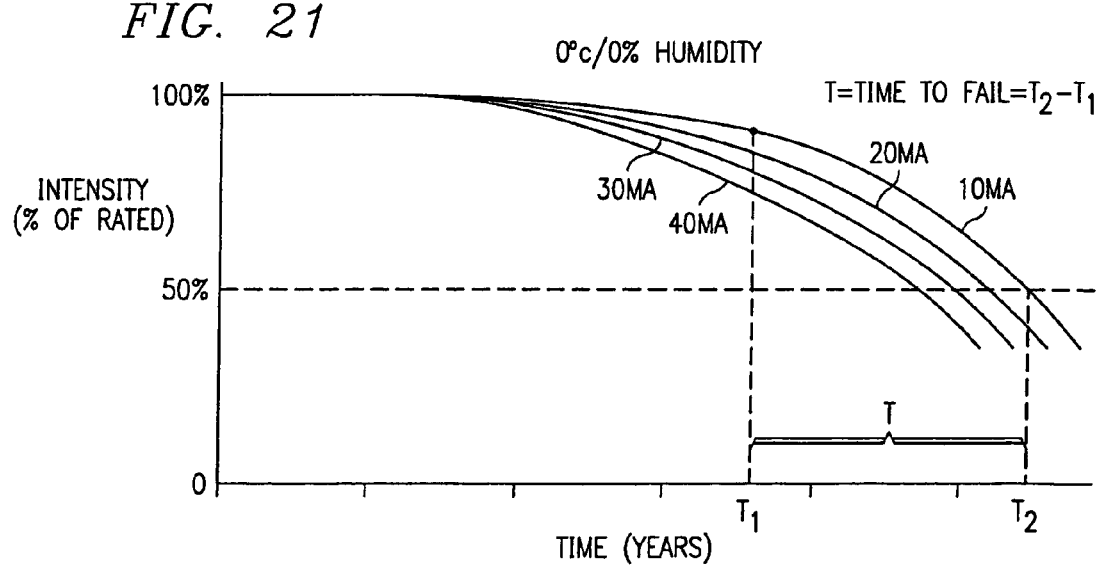

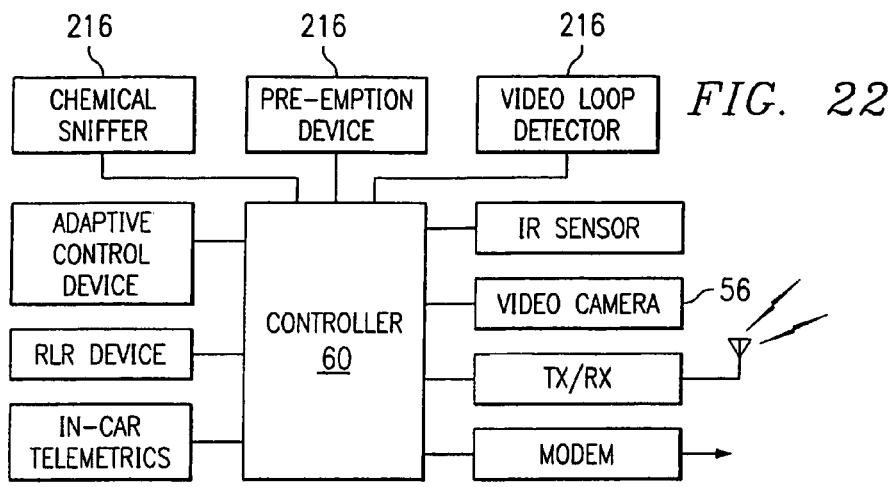
FIG. 22
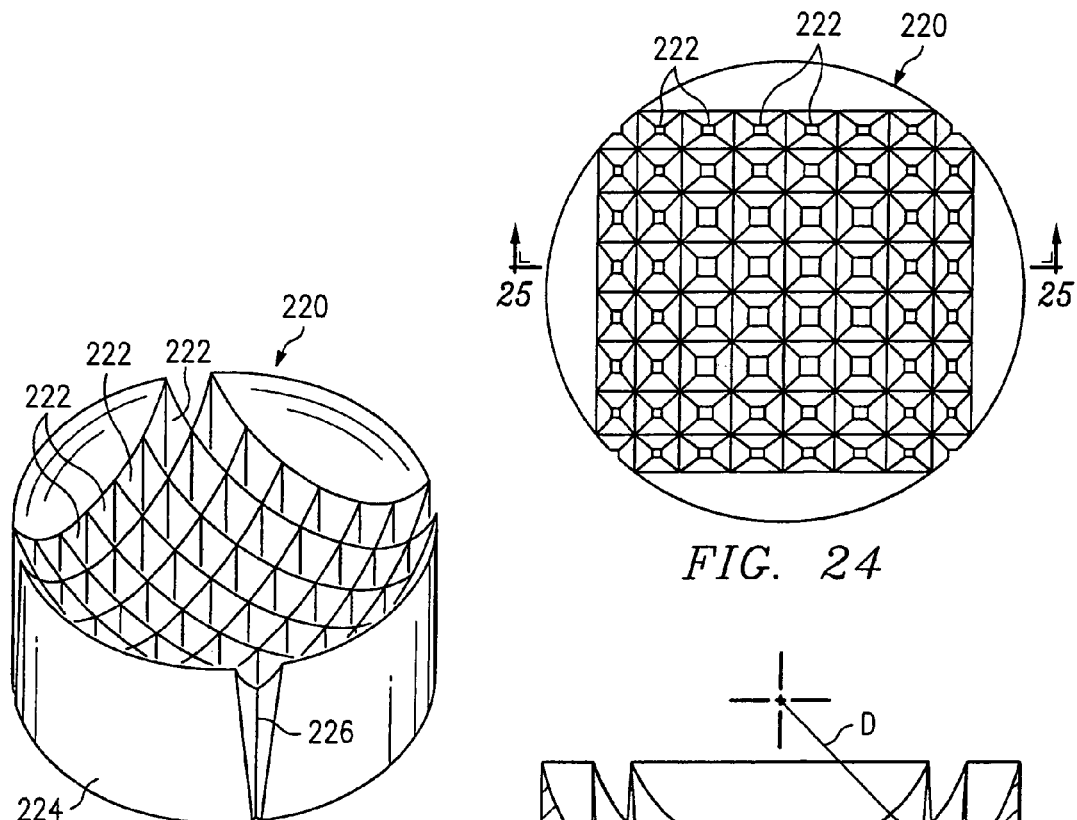
FIG. 24
FIG. 23
FIG. 25

Ambient Reflector Grid

Reflector – Dimensional Detail (Pedestrian)

Bi-Modal Integrated Controllers with Optical Photo Detectors

TRAFFIC SIGNAL LIGHT HAVING AMBIENT LIGHT DETECTION

CLAIM OF PRIORITY

The present application claims priority of Provisional Patent application Ser. No. 60/514,991 entitled "TRAFFIC SIGNAL LIGHT HAVING AMBIENT LIGHT DETECTION" filed Oct. 28, 2003.

CROSS REFERENCE TO RELATED APPLICATION

The present application is a Continuation-In-Part of U.S. patent application Ser. No. 10/643,135 filed Aug. 18, 2003 now U.S. Pat. No. 6,888,474, entitled System and Method for Configuring an Electronically Steerable Beam of a Traffic Signal Light, which is a Continuation-In-Part of U.S. patent application Ser. No. 09/649,661 filed Aug. 29, 2000 now U.S. Pat. No. 6,614,358, entitled Solid State Light With Controlled Light Output, the teachings of which are incorporated by reference herein.

FIELD OF THE INVENTION

The present invention is generally related to traffic signal lights, and more particularly to traffic signal lights operating in varying ambient light conditions.

BACKGROUND OF THE INVENTION

Traffic signal lights have been around for years and are used to efficiently control traffic through intersections. While traffic signals have been around for years, improvements continue to be made in the areas of traffic signal light control algorithms, traffic volume detection, and emergency vehicle detection.

The current state of the art for solid state light sources is as direct replacements for incandescent light sources. The life time of traditional solid state light sources is far longer than incandescent light sources, currently having a useful operational life of 10–100 times that of traditional incandescent light sources. This additional life time helps compensate for the additional cost associated with solid state light sources.

One problem with traditional light sources for traffic signals is detection of the light output using the traditional hand held meter. Ambient light greatly affects the accurate detection of light output from the light source. Therefore, it has been difficult in the past to precisely set the light output to a level that meets DOT standards, but which light source is not over driven to the point of providing more light than necessary, which as previously mentioned, increases temperature and degrades the useful life of the solid state device. One conventional approach is to mount an ambient light sensor near the outer edge of the traffic signal lens cover. However, this design necessitates additional machining due to the additional complexity of the signal light cover, and the need for an additional mounting assembly for the sensor that also uses up valuable space.

There is desired an improved ambient light sensing apparatus and methodology which is less complex, occupies less space and which is not disturbed by the light output of the light source.

SUMMARY OF THE INVENTION

The present invention achieves technical advantages as a traffic signal light utilizing the traffic signal light front lens and an internal reflector to direct ambient light to a sidewall photodetector. The reflector is positioned proximate an LED light source such that the front lens transmits the emitted lightbeam, and also advantageously focuses incoming ambient light therethrough. The reflector preferably comprises a plurality of reflective surfaces directing the incident ambient light to a photo-diode sensor located nearby on one of the circuit boards within the traffic light housing. Preferably, the photodetector is disposed on the circuit board including the traffic signal's integrated controller to conserve space, reduce cost, and facilitate the ease of manufacturing. The incoming ambient light is preferably sensed when the LEDs are in the off state of the duty cycle to prevent the effects of stray light during ambient light detection.

The traffic signal light LED power is adjusted by an integrated controller to compensate for relative levels of ambient light, but the integrated controller is not allowed to change LED power in a manner that may create "flicker" or "flashing". The level of ambient light detection is normalized to prevent extreme changes in LED light intensity that could occur, such as from sensing a vehicle's headlights. The integrated controller processing of the photodetector signal is incrementally changed over time to dampen these transients.

The angle of reflection of the reflector array, including the azimuth and offset, are provided such that incoming ambient light is directed to the nearby photodetector. The photodetector is positioned to collect the redirected light from the traffic signal light front lens.

The placement of the photodetector avoids obstructions that may obscure or shadow the photodetector from the reflected light emanating from the reflector array. The reflector angled surfaces are symmetrical as juxtaposition to both sides of the reflector array. The near angle of the reflector array has a slight offset that maximizes the light reflection to the photodetector.

BRIEF DESCRIPTION OF THE DRAWINGS

FIG. 1A and FIG. 1B is a front perspective view and rear perspective view, respectively, of a solid state light apparatus according to a first preferred embodiment of the present invention including an optical alignment eye piece;

FIG. 2A and FIG. 2B is a front perspective view and a rear perspective view, respectively, of a second preferred embodiment having a solar louvered external air cooled heatsink;

FIG. 16A–F is a schematic diagram of the control circuitry disposed on the daughterboard and incorporating various features of the invention including control logic, as well as light detectors for sensing ambient light and reflected generated light from the light diffuser used to determine and control the light output from the solid state light;

FIG. 20 and 21 illustrate operating characteristics of the LEDs as a function of PWM duty cycles and temperature as a function of generated output light;

FIG. 22 is a block diagram of a modular light apparatus having selectively interchangeable devices that are field replaceable;

FIG. 23 is a perspective view of a light guide having a light channel for each LED to direct the respective LED light to the diffuser;

FIG. 24 shows a top view of FIG. 23 of the light guide for use with the diffuser; and FIG. 25 shows a side sectional view taken along line 24—24 in FIG. 3 illustrating a separate light guide cavity for each LED extending to the light diffuser.

DETAILED DESCRIPTION OF THE PREFERRED EMBODIMENT

Figure 3:
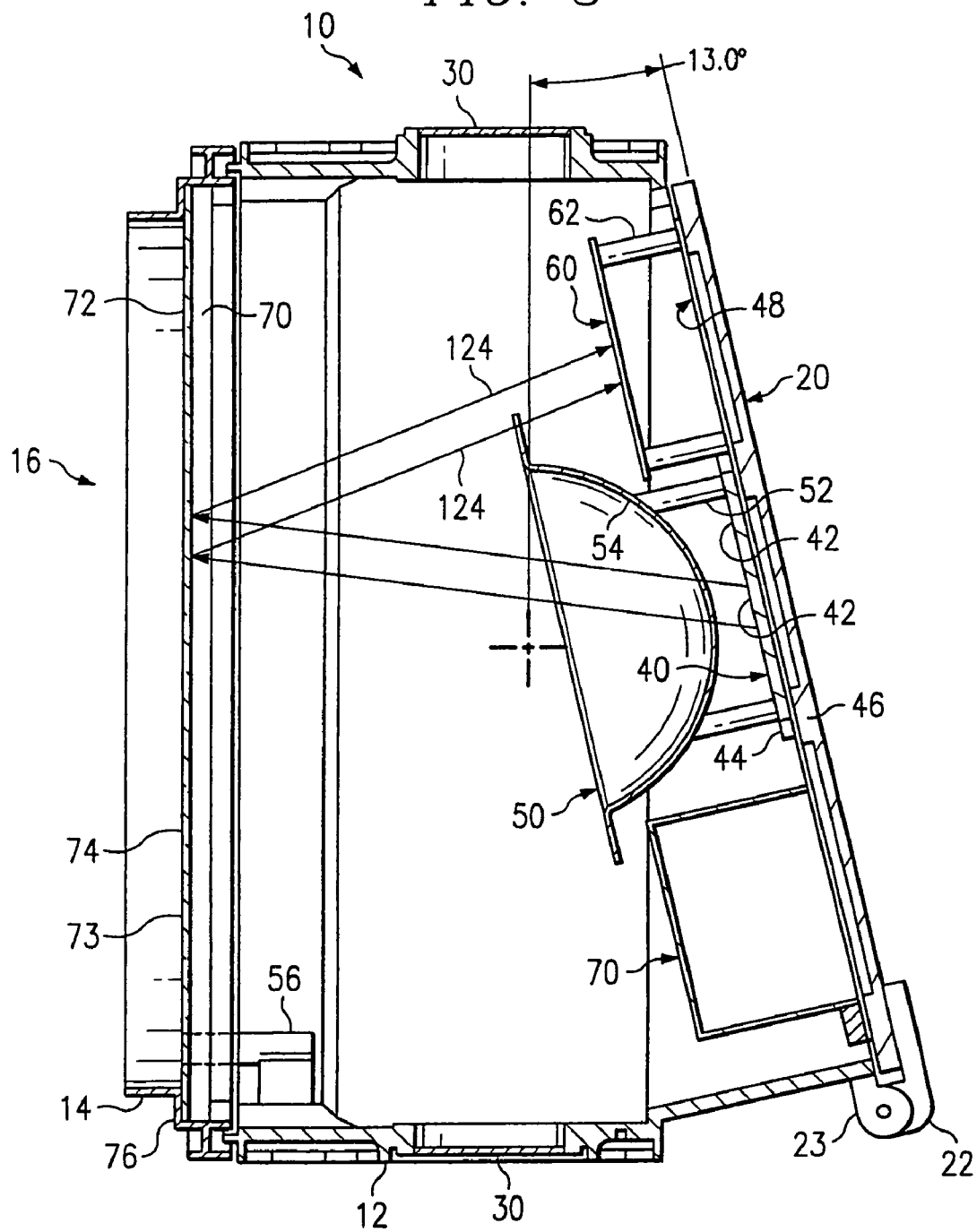
FIG. 3 is a side sectional view of the apparatus shown in FIG. 1 illustrating the electronic and optical assembly and lens system comprising an array of LEDs directly mounted to a heatsink, directing light through a diffuser and through a Fresnel lens.

Referring now to FIG. 1A, there is illustrated generally at 10 a front perspective view of a solid state lamp apparatus according to a first preferred embodiment of the present invention. Light apparatus 10 is seen to comprise a trapezoidal shaped housing 12, preferably comprised of plastic formed by a plastic molding injection techniques, and having adapted to the front thereof a pivoting lid 14. Lid 14 is seen to have a window 16, as will be discussed shortly, permitting light generated from within housing 12 to be emitted as a lightbeam therethrough. Lid 14 is selectively and securable attached to housing 12 via a hinge assemble 17 and secured via latch 18 which is juxtaposed with respect to a housing latch 19, as shown.

Referring now to FIG. 1B and FIG. 2B, there is illustrated a second preferred embodiment of the present invention at 32 similar to apparatus 10, whereby a housing 33 includes a solar louver 34 as shown in FIG. 2B. The solar louver 34 is secured to housing 33 and disposed over a external heatsink 20 which shields the external heatsink 20 from solar radiation while permitting outside airflow across the heatsink 20 and under the shield 34, thereby significantly improving cooling efficiency as will be discussed more shortly.

Referring to FIG. 2A, there is shown light apparatus 10 of FIG. 1A having a rear removable back member 20 comprised of thermally conductive material and forming a heatsink for radiating heat generated by the internal solid state light source, to be discussed shortly. Heatsink 20 is seen to have secured thereto a pair hinges 22 which are rotatably coupled to respective hinge members 23 which are securely attached and integral to the bottom of the housing 12, as shown. Heatsink 20 is further seen to include a pair of opposing upper latches 24 selectively securable to respective opposing latches 25 forming an integral portion of and secured to housing 12. By selectively disconnecting latches 24 from respective latches 25, the entire rear heatsink 20 may be pivoted about members 23 to access the internal portion of housing 12, as well as the light assembly secured to the front surface of heatsink 20, as will be discussed shortly in regards to FIG. 3.

Still referring to FIG. 2A, light apparatus 10 is further seen to include a rear eye piece 26 including a U-shaped bracket extending about heatsink 20 and secured to housing 12 by slidably locking into a pair of respective locking members 29 securely affixed to respective sidewalls of housing 12. Eye piece 26 is also seen to have a cylindrical optical sight member 28 formed at a central portion of, and extending rearward from, housing 12 to permit a user to optically view through apparatus 10 via optically aligned window 16 to determine the direction a lightbeam, and each LED, is directed, as will be described in more detail with reference to FIG. 14 and FIG. 15. Also shown is housing 12 having an upper opening 30 with a serrated collar centrally located within the top portion of housing 12, and opposing opening 30 at the lower end thereof, as shown in FIG. 3. Openings 30 facilitate securing apparatus 10 to a pair of vertical posts allowing rotation laterally thereabout.

Referring now to FIG. 3, there is shown a detailed cross sectional view taken along line 3—3 in FIG. 1, illustrating a solid state light assembly 40 secured to rear heatsink 20 in such an arrangement as to facilitate the transfer of heat generated by light assembly 40 to heatsink 20 for the dissipation of heat to the ambient via heatsink 20.

Solid state light assembly 40 is seen to comprise an array of light emitting diodes (LEDs) 42 aligned in a matrix, preferably comprising an 8×8 array of LEDs each capable of generating a light output of 1–3 lumens. However, limitation to the number of LEDs or the light output of each is not to be inferred. Each LED 42 is directly bonded to heatsink 20 within a respective light reflector comprising a recess defined therein. Each LED 42 is hermetically sealed by a glass material sealingly diffused at a low temperature over the LED die 42 and the wire bond thereto, such as 8000 Angstroms of, $SiO_2$ or $Si_3N_4$ material diffused using a semiconductor process. The technical advantages of this glass to metal hermetic seal over plastic/epoxy seals is significantly a longer LED life due to protecting the LED die from oxygen, humidity and other contaminants. If desired, for more light output, multiple LED dies 42 can be disposed in one reflector recess. Each LED 42 is directly secured to, and in thermal contact arrangement with, heatsink 20, whereby each LED is able to thermally dissipate heat via the bottom surface of the LED. Interfaced between the planar rear surface of each LED 42 is a thin layer of heat conductive material 46, such as a thin layer of epoxy or other suitable heat conductive material insuring that the entire rear surface of each LED 42 is in good thermal contact with rear heatsink 20 to efficiently thermally dissipate the heat generated by the LEDs. Each LED connected electrically in parallel has its cathode electrically coupled to the heatsink 20, and its Anode coupled to drive circuitry disposed on daughterboard 60. Alternatively, if each LED is electrically connected in series, the heatsink 20 preferably is comprised of an electrically non-conductive material such as ceramic.

Further shown in FIG. 3 is a main circuit board 48 secured to the front surface of heatsink 20, and having a central opening for allowing LED to pass generated light therethrough. LED holder 44 mates to the main circuit board 48 above and around the LEDs 42, and supports a lens 86 above each LED. Also shown is a light diffuser 50 secured above the LEDs 42 by a plurality of standoffs 52, and having a rear curved surface 54 spaced from and disposed above the LED solid state light source 40, as shown. Each lens 86 (FIG. 9) is adapted to ensure each LED 42 generates light which impinges the rear surface 54 having the same surface area. Specifically, the lenses 86 at the center of the LED array have smaller radius of curvature than the lenses 86 covering the peripheral LEDs 42. The diffusing lenses 46 ensure each LED illuminates the same surface area of light diffuser 50, thereby providing a homogeneous (uniform) lightbeam of constant intensity.

A daughter circuit board 60 is secured to one end of heatsink 20 and main circuit board 48 by a plurality of standoffs 62, as shown. At the other end thereof is a power supply 70 secured to the main circuit board 48 and adapted to provide the required drive current and drive voltage to the LEDs 42 comprising solid state light source 40, as well as electronic circuitry disposed on daughterboard 60, as will be discussed shortly in regards to the schematic diagram shown in FIG. 16. Light diffuser 50 uniformly diffuses light generated from LEDs 42 of solid state light source 40 to produce a homogeneous lightbeam directed toward window 16.

Window 16 is seen to comprise a lens 70, and a Fresnel lens 72 in direct contact with lens 70 and interposed between lens 70 and the interior of housing 12 and facing light diffuser 50 and solid state light source 40. Lid 14 is seen to have a collar defining a shoulder 76 securely engaging and holding both of the round lens 70 and 72, as shown, and transparent sheet 73 having defined thereon grid 74 as will be discussed further shortly. One of the lenses 70 or 72 are colored to produce a desired color used to control traffic including green, yellow, red, white and orange.

It has been found that with the external heatsink being exposed to the outside air the outside heatsink 20 cools the LED die temperature up to 50° C. over a device not having a external heatsink. This is especially advantageous when the sun setting to the west late in the afternoon such as at an elevation of 100 or less, when the solar radiation directed in to the lenses and LEDs significantly increasing the operating temperature of the LED die for westerly facing signals. The external heatsink 20 prevents extreme internal operating air and die temperatures and prevents thermal runaway of the electronics therein.

Figure 4:
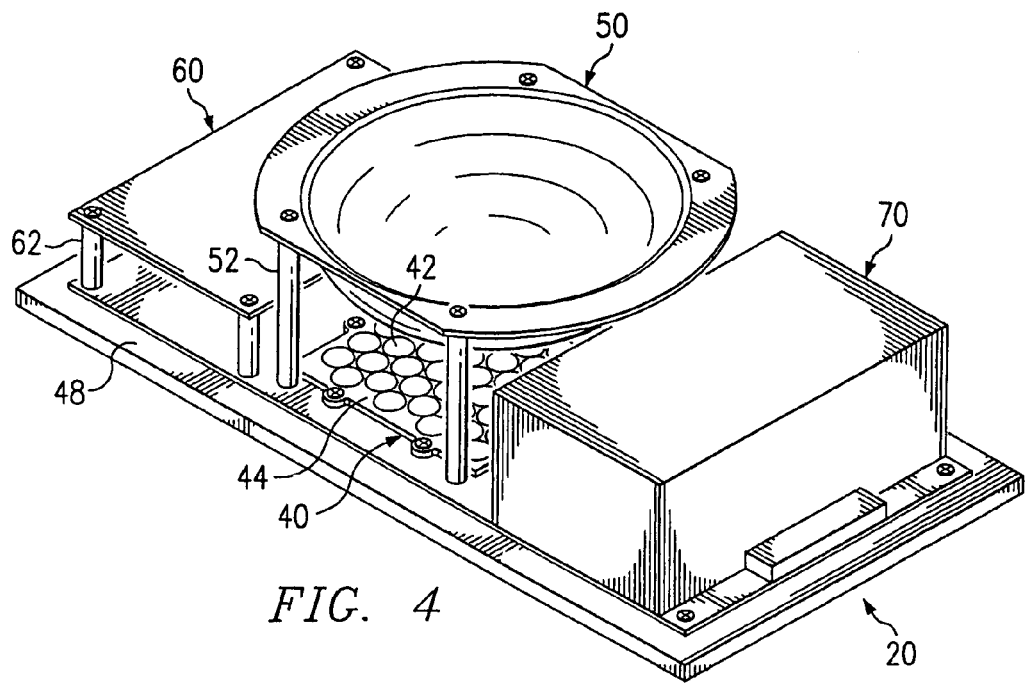
FIG. 4 is a perspective view of the electronic and optical assembly comprising the LED array, lens holder, light diffuser, power supply, main motherboard and daughterboard.

Referring now to FIG. 4, there is shown the electronic and optic assembly comprising of solid state light source 40, light diffuser 50, main circuit board 48, daughter board 60, and power supply 70. As illustrated, the electronic circuitry on daughter board 60 is elevated above the main board 48, whereby standoffs 62 are comprised of thermally nonconductive material.

Figure 5:
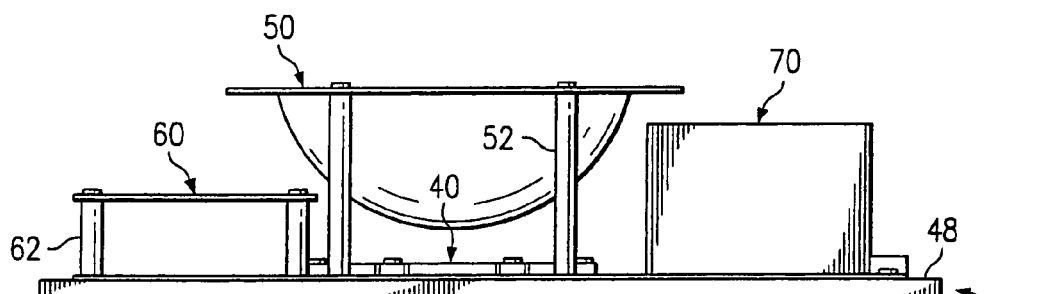
FIG. 5 is a side view of the assembly of FIG. 4 illustrating the array of LEDs being directly mounted to the heatsink, below respective lenses and disposed beneath a light diffuser, the heatsink for terminally dissipating generated heat.

Referring to FIG. 5, there is shown a side view of the assembly of FIG. 4 illustrating the light diffuser 50 being axially centered and disposed above the solid state LED array 40. Diffuser 50, in combination with the varying diameter lenses 86, facilitates light generated from the LEDs 42 to be uniformly disbursed and have uniform intensity and directed upwardly as a lightbeam toward the lens 70 and 72, as shown in FIG. 3.

Figure 6:
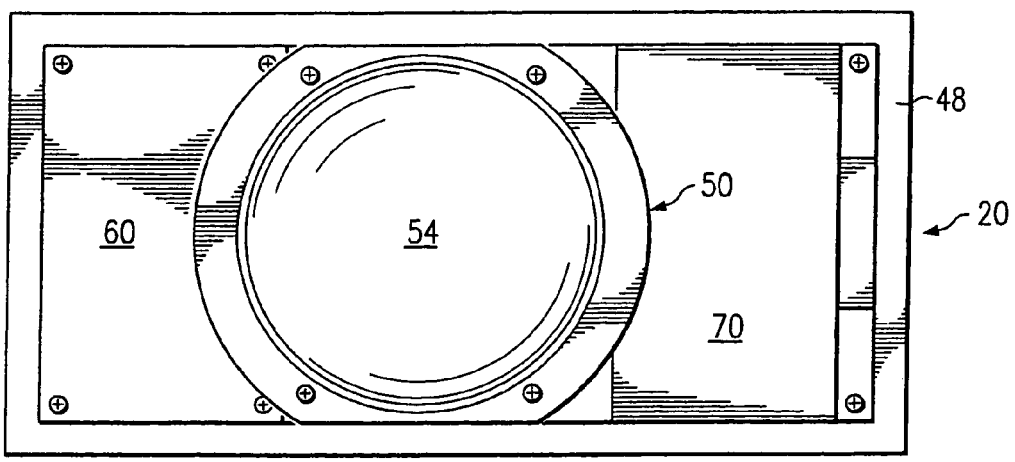
FIG. 6 is a top view of the electronics assembly of FIG. 4.
Figure 7:
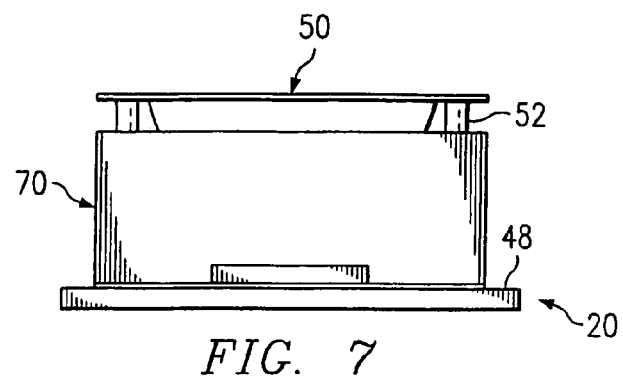
FIG. 7 is a side view of the electronics assembly of FIG. 4.

Referring now to FIG. 6, there is shown a top view of the assembly shown in FIG. 4, whereby FIG. 7 illustrates a side view of the same.

Figure 8:
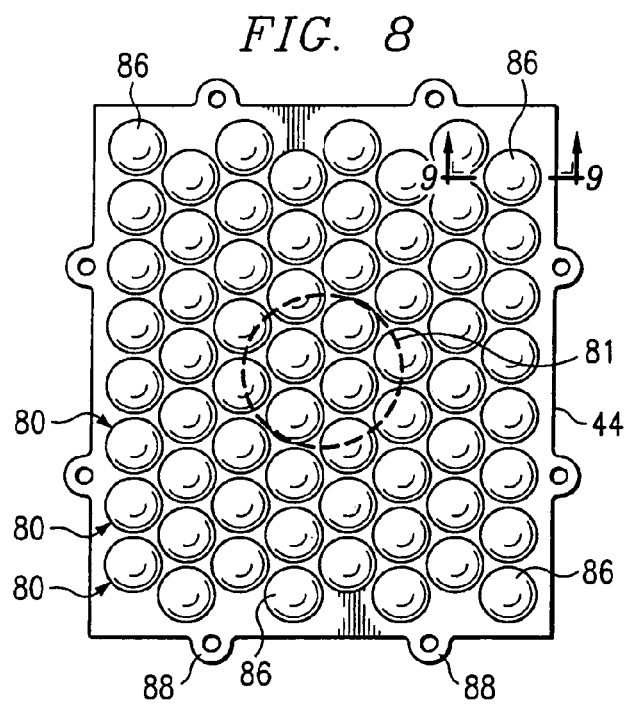
FIG. 8 is a top view of the lens holder adapted to hold lenses for the array of LEDs.

Referring now to FIG. 8, there is shown a top view of the lens holder 44 comprising a plurality of openings 80 each adapted to receive one of the LED lenses 86 hermetically sealed to and bonded thereover. Advantageously, the glass to metal hermetic seal has been found in this solid state light application to provide excellent thermal conductivity and hermetic sealing characteristics. Each opening 80 is shown to be defined in a tight pack arrangement about the plurality of LEDs 42. As previously mentioned, the lenses 86 at the center of the array, shown at 81, have a smaller curvature diameter than the lenses 86 over the perimeter LEDs 42 to increase light dispersion and ensure uniform light intensity impinging diffuser 50.

Figure 9:
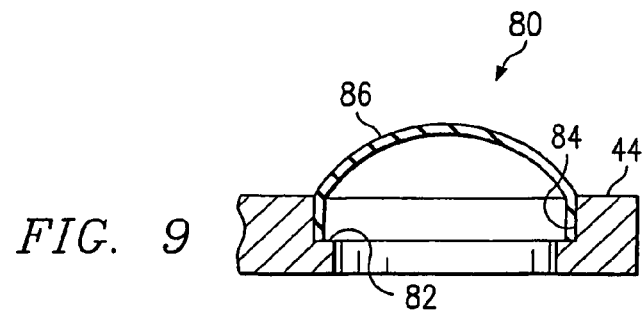
FIG. 9 is a sectional view taken alone lines 9—9 in FIG. 8 illustrating a shoulder and side wall adapted to securely receive a respective lens for a LED mounted thereunder.

Referring to FIG. 9, there is shown a cross section taken alone line 9—9 in FIG. 8 illustrating each opening 80 having an annular shoulder 82 and a lateral sidewall 84 defined so that each cylindrical lens 86 is securely disposed within opening 80 above a respective LED 42. Each LED 42 is preferably mounted to heatsink 20 using a thermally conductive adhesive material such as epoxy to ensure there is no air gaps between the LED 42 and the heatsink 20. The present invention derives technical advantages by facilitating the efficient transfer of heat from LED 42 to the heatsink 20.

Figure 10:
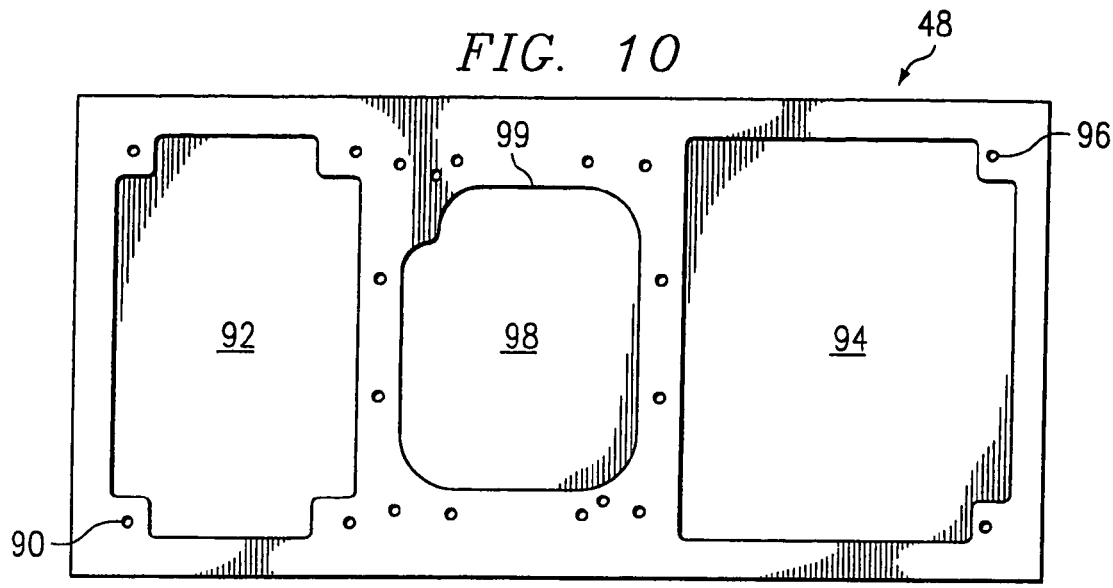
FIG. 10 is a top view of the heatsink comprised of a thermally conductive material and adapted to securingly receive each LED, the LED holder of FIG. 8, as well as the other componentry.

Referring now to FIG. 10, there is shown a top view of the main circuit board 48 having a plurality of openings 90 facilitating the attachment of standoffs 62 securing the daughter board above an end region 92. The power supply 48 is adapted to be secured above region 94 and secured via fasteners disposed through respective openings 96 at each corner thereof. Center region 98 is adapted to receive and have secured thereagainst in a thermal conductive relationship the LED holder 42 with the thermally conductive material 46 being disposed thereupon. The thermally conductive material preferably comprises of epoxy, having dimensions of, for instance, 0.05 inches. A large opening 99 facilitates the attachment of LEDs 42 to the heatsink 20, and such that light from the LEDs 42 is directed to the light diffuser 50.

Figure 11:
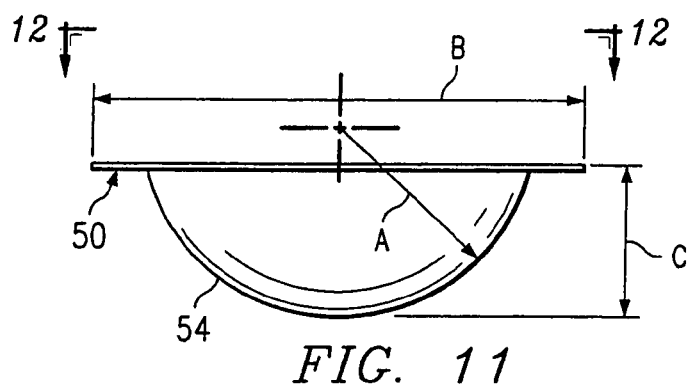
FIG. 11 is a side view of the light diffuser depicting its radius of curvature.

Referring now to FIG. 11, there is shown a side elevational view of diffuser 50 having a lower concave surface 54, preferably having a radius A of about 2.4 inches, with the overall diameter B of the diffuser including a flange 55 being about 6 inches. The depth of the rear surface 52 is about 1.85 inches as shown as dimension C.

Figure 12:
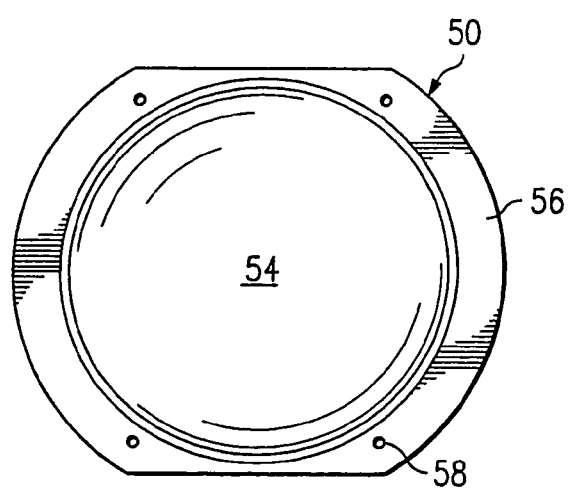
FIG. 12 is a top view of the light diffuser of FIG. 11 illustrating the mounting flanges thereof.

Referring to FIG. 12, there is shown a top view of the diffuser 50 including the flange 56 and a plurality of openings 58 in the flange 56 for facilitating the attachment of standoffs 52 to and between diffuser 50 and the heatsink 20, shown in FIG. 4.

Figure 13:
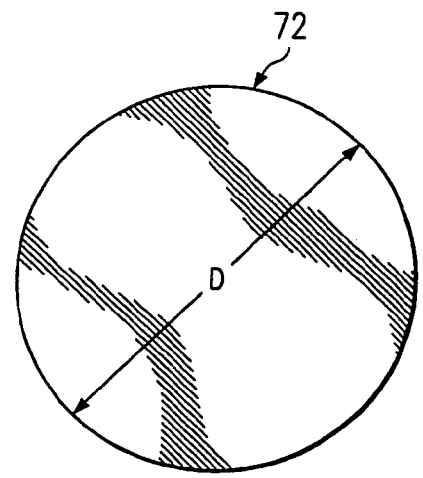
FIG. 13 is a top view of a Fresnel lens as shown in FIG. 3.

Referring now to FIG. 13 there is shown the Fresnel lens 72, preferably having a diameter D of about 12.2 inches. However, limitation to this dimension is not to be inferred, but rather, is shown for purposes of the preferred embodiment of the present invention. The Fresnel lens 72 has a predetermined thickness, preferably in the range of about 1/16 inches. This lens is typically fabricated by being cut from a commercially available Fresnel lens.

Referring now back to FIG. 1A and FIG. 1B, there is shown generally at 56 a video camera oriented to view forward of the front face of solid state lamp 10 and 30, respectively. The view of this video camera 56 is precisionaly aligned to view along and generally parallel to the central longitudinal axis shown at 58 that the beam of light generated by the internal LED array is oriented. Specifically, at large distances, such as greater than 20 feet, the video camera 56 generates an image having a center of the image generally aligned with the center of the lightbeam directed down the center axis 58. This allows the field technician to remotely electronically align the orientation of the lightbeam referencing this video image.

Figure 14A:
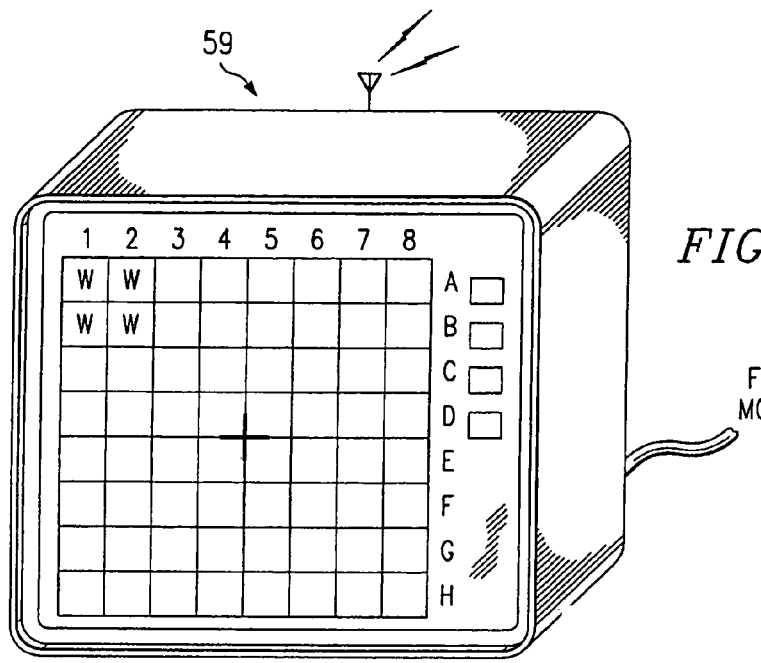
FIG. 14A is a view of a remote monitor displaying an image generated by a video camera in the light apparatus to facilitate electronic alignment of the LED lightbeam.

For instance, in one preferred embodiment the control electronics 60 has software generating and overlaying a grid along with the video image for display at a remote display terminal, such as a LCD or CRT display shown at 59 in FIG. 14A. This video image is transmitted electronically either by wire using a modem, or by wireless communication using a transmitter allowing the field technician on the ground to ascertain that portion of the road that is in the field of view of the generated lightbeam. By referencing this displayed image, the field technician can program which LEDS 42 should be electronically turned on, with the other LEDs 42 remaining off, such that the generated lightbeam will be focused by the associated optics including the Fresnel lens 72, to the proper lane of traffic. Thus, on the ground, the field technician can electronically direct the generated lightbeam from the LED arrays, by referencing the video image, to the proper location on the ground without mechanical adjustment at the light source, such as by an operator situated in a DOT bucket. For instance, if it is intended that the objects viewable and associated with the upper four windows defined by the grid should be illuminated, such as those objects viewable through the windows labeled as W in FIG. 14A, the LEDs 42 associated with the respective windows "W" will be turned on, with the rest of the LEDs 46 associated with the other windows being turned off. Preferably, there is one LED 46 associated with each window defined by the grid. Alternatively, a transparent sheet 73 having a grid 74 defining windows 78 can be laid over the display surface of the remote monitor 59 whereby each window 78 corresponds with one LED. For instance, there may be 64 windows associated with the 64 LEDs of the LED array. Individual control of the respective LEDs is discussed hereafter in reference to FIG. 14A. The video camera 56, such as a CCD camera or a CMOS camera, is physically aligned alone the central axis 58, such that at extended distances the viewing area of the camera 56 is generally along the axis 58 and thus is optically aligned with regards to the normal axis 58 for purposes of optical alignment.

Figure 14B:
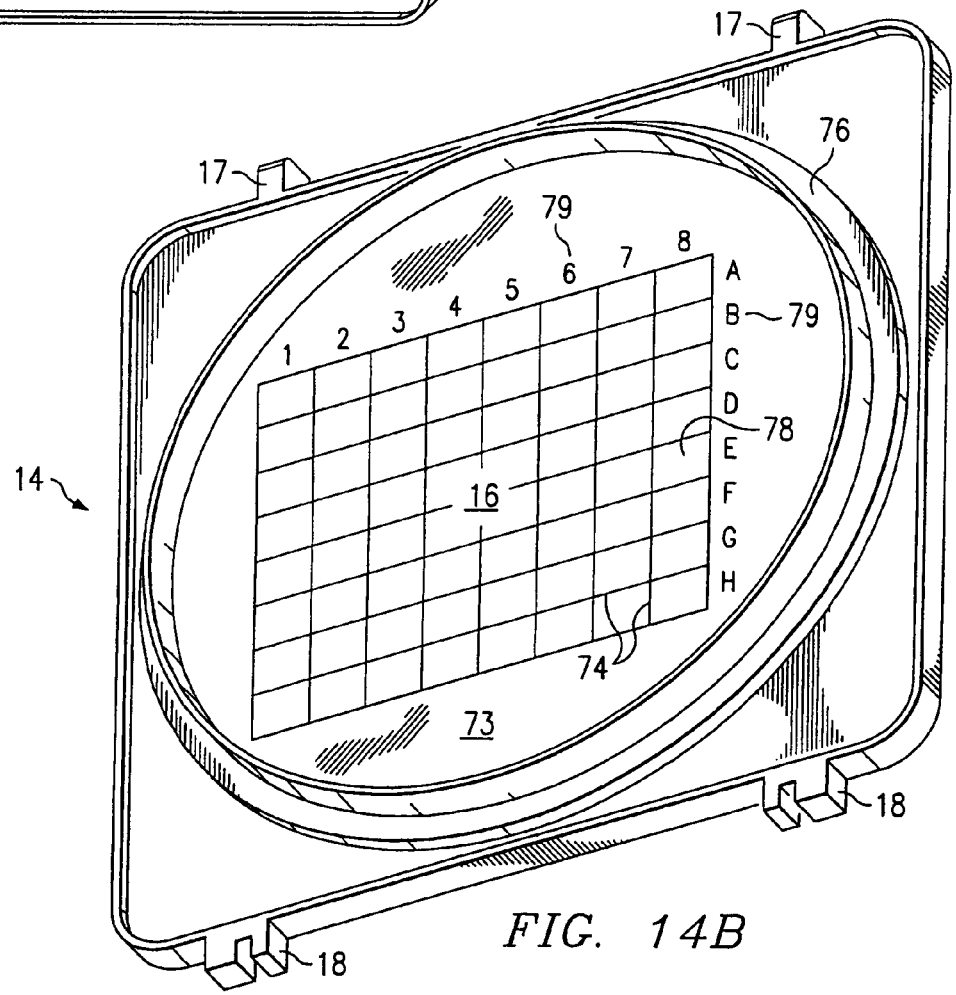
FIG. 14B is a perspective view of the lid of the apparatus shown in FIG. 1 having a grid overlay for use with the optical alignment system.

Referring now to FIG. 14B, there is illustrated the lid 14, the hinge members 17, and the respective latches 18. Holder 14 is seen to further have an annular flange member 70 defining a side wall about window 16, as shown. Further shown the transparent sheet 73 and grid 74 comprising of thin line markings defined over openings 16 defining windows 78. The sheet can be selectively placed over window 16 for alignment, and which is removable therefrom after alignment. Each window 78 is precisionaly aligned with and corresponds to one sixty four (64) LEDs 42. Indicia 79 is provided to label the windows 78, with the column markings preferably being alphanumeric, and the columns being numeric. The windows 78 are viable through optical sight member 28, via an opening in heatsink 20. The objects viewed in each window 78 are illuminated substantially by the respective LED 42, allowing a technician to precisionaly orient the apparatus 10 so that the desired LEDs 42 are oriented to direct light along a desired path and be viewed in a desired traffic lane. The sight member 28 may be provided with cross hairs to provide increased resolution in combination with the grid 74 for alignment.

Moreover, electronic circuitry 100 on daughterboard 60 can drive only selected LEDs 42 or selected 4×4 portions of array 40, such as a total of 16 LEDs 42 being driven at any one time. Since different LEDs have lenses 86 with different radius of curvature different thicknesses, or even comprised of different materials, the overall lightbeam can be electronically steered in about a 15° cone of light relative to a central axis defined by window 16 and normal to the array center axis.

For instance, driving the lower left 4×4 array of LEDs 42, with the other LEDs off, in combination with the diffuser 50 and lens 70 and 72, creates a lightbeam +7.5 degrees above a horizontal axis normal to the center of the 8×8 array of LEDs 42, and +7.5 degrees right of a vertical axis. Likewise, driving the upper right 4×4 array of LEDs 42 would create a lightbeam +10 degrees off the horizontal axis and +7.5 degrees to the right of a normalized vertical axis and −7.5 degrees below a vertical axis. The radius of curvature of the center lenses 86 may be, for instance, half that of the peripheral lenses 86. A beam steerable +/−7.5 degrees in 1–2 degree increments is selectable. This feature is particularly useful when masking the opening 16, such as to create a turn arrow. This further reduces ghosting or roll-off, which is stray light being directed in an unintended direction and viewable from an unintended traffic lane.

The electronically controlled LED array provides several technical advantages including no light is blocked, but rather is electronically steered to control a beam direction. Low power LEDs are used, whereby the small number of the LEDs "on" (i.e. 4 of 64) consume a total power about 1–2 watts, as opposed to an incandescent prior art bulb consuming 150 watts or a flood 15 watt LED which are masked or lowered. The present invention reduces power and heat generated thereby.

Figure 15:
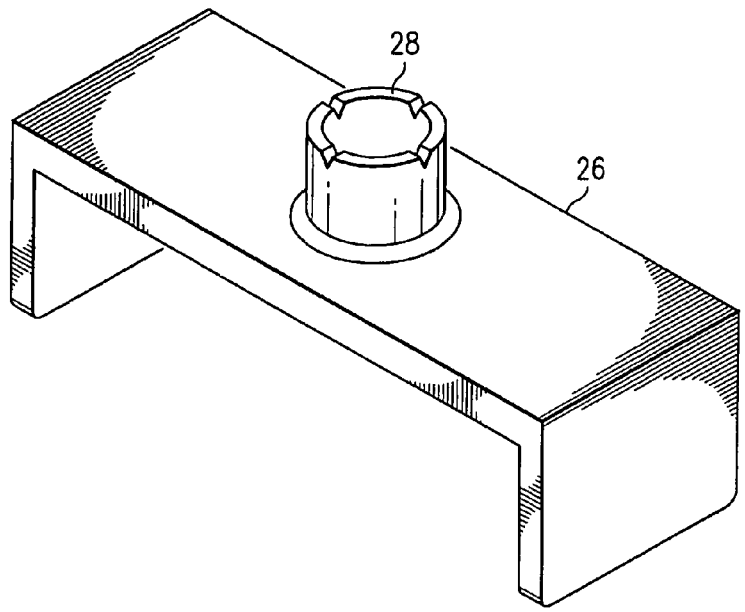
FIG. 15 is a perspective view of the optical alignment system eye piece adapted to connect to the rear of the light unit shown in FIG. 1.

Referring now to FIG. 15, there is shown a perspective view of the eye piece 26 as well as the optical sight member 28, as shown in FIG. 1. the center axis of optical sight member 28 is oriented along the center of the 8×8 LED array.

Figure 16A:
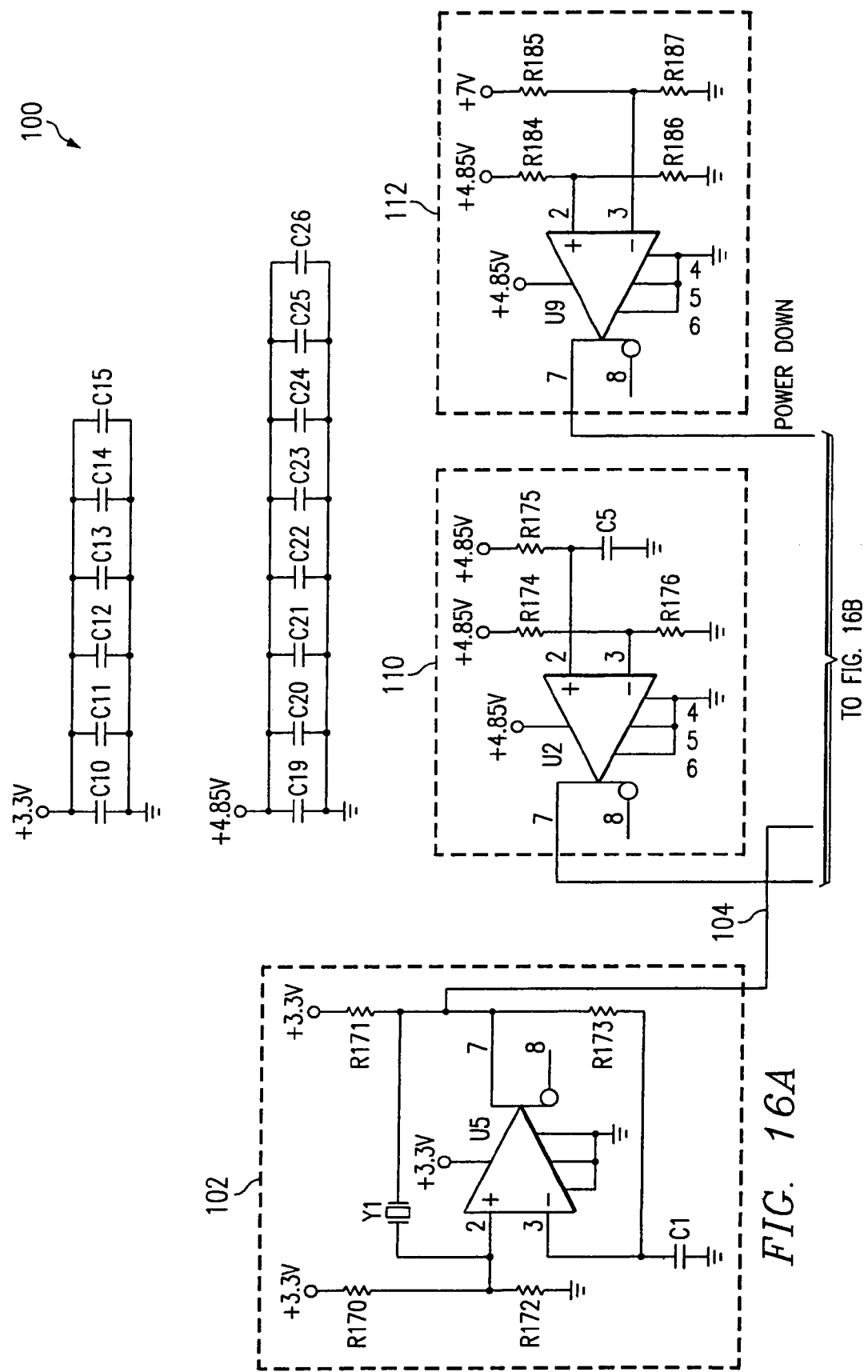

Referring now to FIG. 16A, there is shown at 100 a schematic diagram of the circuitry controlling light apparatus 10. Circuit 10 is formed on the daughterboard 60, and is electrically connected to the LED solid state light source 40, and selectively drives each of the individual LEDs 42 comprising the array. Depicted in FIG. 16A is a complex programmable logic device (CPLD) shown as U1. CPLD U1 is preferably an off-the-shelf component such as provided by Maxim Corporation, however, limitation to this specific part is not to be inferred. For instance, discrete logic could be provided in place of CPLD U1 to provide the functions as is described here, with it being understood that a CPLD is the preferred embodiment is of the present invention. CPLD U1 has a plurality of interface pins, and this embodiment, shown to have a total of 144 connection pins. Each of these pin are numbered and shown to be connected to the respective circuitry as will now be described.

Shown generally at 102 is a clock circuit providing a clock signal on line 104 to pin 125 of the CPLD U1. Preferably, this clock signal is a square wave provided at a frequency of 32.768 KHz. Clock circuit 102 is seen to include a crystal oscillator 106 coupled to an operational amplifier U5 and includes associated trim components including capacitors and resistors, and is seen to be connected to a first power supply having a voltage of about 3.3 volts.

Still referring to FIG. 16A, there is shown at 110 a power-up clear circuit comprised of an operational amplifier shown at U2 preferably having the non-inverting output coupled to pin 127 of CPLD U1. The inverting input is seen to be coupled between a pair of resistors, R174 and R176, providing a voltage divide circuit, providing approximately a 2.425 volt reference signal when based on a power supply of 4.85 volts being provided to the positive rail of the voltage divide network. The non-inverting input is preferably coupled to the 4.85 voltage reference via a current limiting resistor R175, as shown. Upon power up, the voltage at the non-inverting input will come up slower than the voltage at the inverting input due to the slower rise time induced by capacitor C5. The voltage at the non-inverting input will rise, and will eventually exceed the voltage at the inverting input after the 4.85V power supply has stabilized and comparator U2 responsively generate a logic 1 to Pin 127 of U1 to indicate a stable power supply.

As shown at 112, an operational amplifier U6 is shown to have its non-inverting output connected to pin 109 of CPLD U1. Operational amplifier U9 provides a power down function.

Referring now to ambient light detection circuit 120, there is shown circuitry detecting ambient light intensity and comprising of at least one photodiode identified as PD1, although more than one spaced photodiode PD1 could be provided. An operational amplifier depicted as U10 is seen to have its non-inverting output coupled to input pin 100 of CPLD U1. The non-inverting input of amplifier U10 is connected to the anode of photodiode PD1, which photodiode has its cathode connected to the second power supply having a voltage of about 4.85 volts. The non-inverting input of amplifier U10 is also connected via a current via a current limiting resistor to ground. The inverting reference input of amplifier U10 is coupled to input 99 and 101 of CPLD U1 via a voltage divide network and comparators U8 and U9. A second comparator U11 has a non-inverting input also coupled to the anode of photodiode PD1, and the inverting reference input connected the resistive voltage divide network. Both comparators U10 and U11 determines if the DC voltage generated by the photodiode PD1, which is indicative of the sensed ambient light intensity, exceeds a respective different voltage threshold provided to the respective inverting input. A lower reference threshold voltage is provided to comparator U11 then the reference threshold voltage provided to comparator U10 to provide a second ambient light intensity threshold detection.

Referring now to the beam intensity detection circuit 122 including a comparator U7 and an optical feedback circuit 123, these components will now be discussed in detail. The beam intensity circuit 122 detects the intensity of backscattered light from Fresnel lens 72, as shown at 124 in FIG. 3, whereby the intensity of the sensed backscattered light is indicative of the beam intensity generated by the solid state apparatus 10 and 40. That is, the intensity of a sensed backscattered light 124 is directive proportional to the intensity of the lightbeam generated by apparatus 10 and 40 and is proportional thereto.

Referring to FIG. 16A, comparator U7 has its inverting reference input coupled to pin 86 of CPLD U1 and is provided with a DC reference voltage therefrom. This reference DC voltage establishes the nominal voltage for comparison against the DC feedback voltage provided by the optical feedback circuit 123 at node F as will now be described in considerable detail.

Figure 16B:
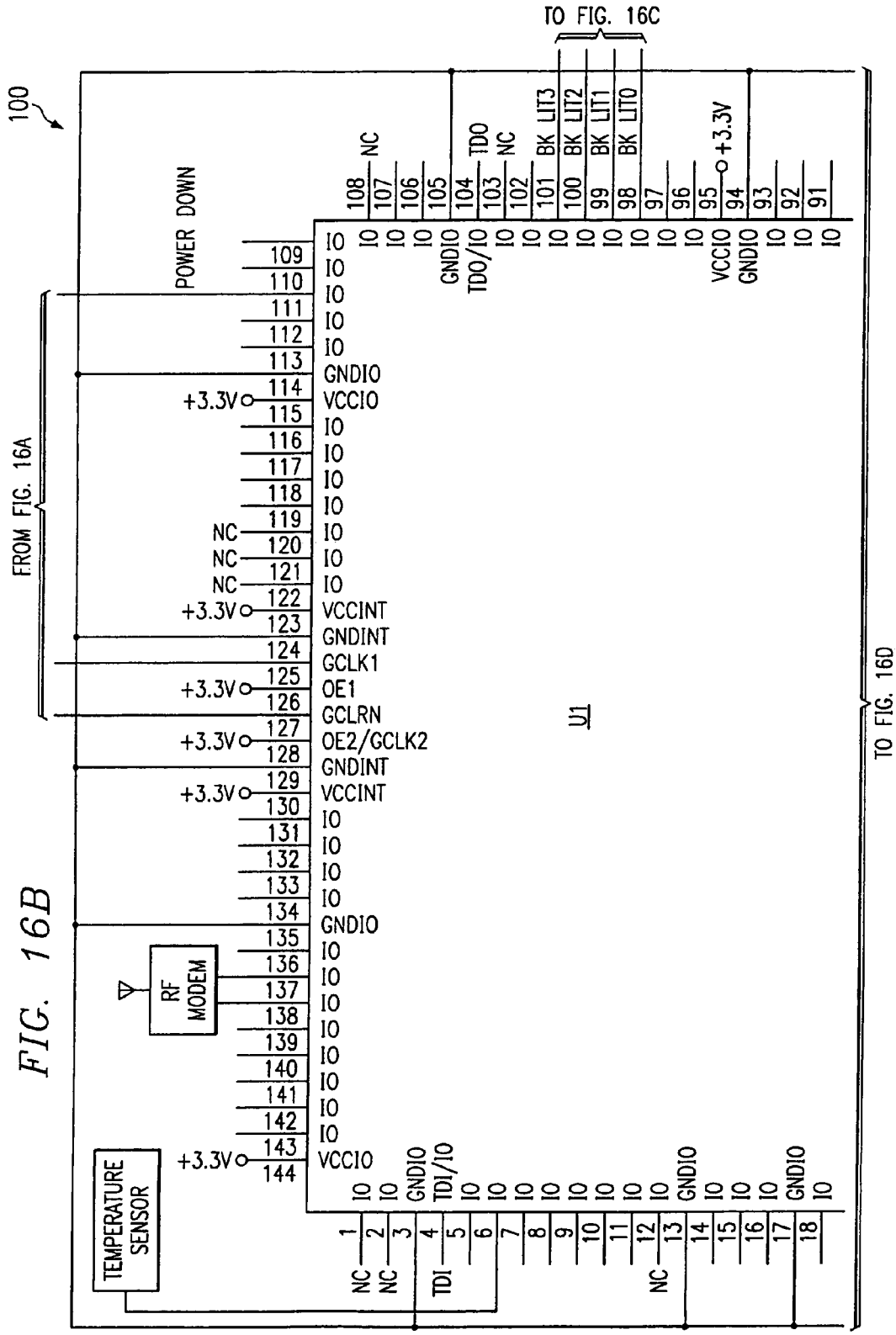

Referring to FIG. 16B, there is illustrated the optical feedback circuit 123 comprising a plurality of photodiode's PD2 seen to all be connected in parallel between a 4.85 volt source and a summation node 125. This summation node 125 is coupled via a large resistor to ground, as shown. Both the ambient light, and the pulsed backscattered from the Fresnel lens, are detected by these plurality of photodiode's PD2 which generate a respective DC and AC voltage component as a function of the respective intensity of light directed thereupon. For instance, the ambient light from external solid state light apparatus 10 and 40 is transmitted through the Fresnel lens to the photodiode's PD2. These photodiode's PD2 generate a corresponding DC voltage that is proportional the intensity of the ambient light impinging thereupon. In addition, the backscattered pulsed light generated by the LEDs 42 onto the photodiode's PD2 induces an AC voltage component that is proportional to the intensity of the sensed pulsed backscattered light. Since the light generated by the LED array comprising LEDs 42 is pulsed with modulated at about 1 kilohertz, this AC voltage component has the same frequency of about 1 kilohertz. Both the AC and DC voltage components generated by the plurality of photodiode's PD2 are summed at summation node 125. Series capacitor C18 provides capacitive coupling between this summation node 125 and the inverting input of single ended amplifier U20 to pass on to the AC voltage component to the inverting input of amplifier U20, which AC voltage corresponds to the pulsed light generated by the LED array. Thus, at the inverting input of amplifier U20, the magnitude of the AC voltage component is directly proportional to and indicative of the intensity of pulsed light sensed by the photodiode's PD2 and backscattered from the Fresnel lens 72. Amplifier U20 has its non-inverting input tied to ground, as shown. Amplifier U20 provides a gain of roughly 1,000 as determined by the ratio of resistors R2 and R1, whereby the gain equals R2/R1.

The inverting output of amplifier U20 is connected via a large series capacitor C30 to a node A. This node A is connected via a resistor R100 to a feedback node F as well as to the emitter of NPN transistor Q1. A larger capacitor C31 tied between the feedback node F and ground is substantially smaller than the capacitor C30, whereby resistor R100 and capacitor C31 provide an integrator function and operate as a low pass RC filter. The RC integrator comprised of R100 and capacitor C31 integrate the AC voltage at node A to provide a DC voltage at node F that is a function of both the duty cycle of the pulsed PWM AC voltage at node A as well as the amplitude of the pulsed PWM AC voltage at node A. Transistor Q1 in combination with resistor 200 and diode D3 maintain node A close to ground at one condition while allowing a variable high level signal.

By way of example, if the plurality of photodiode's PD2 sense incident pulsed light backscattered from Fresnel lens 72 at a first intensity and provide at summation node 125 a 1 millivolt peak-to-peak signal having a 50% duty cycle, amplifier U20 will provide a 0.5 volt peak-to-peak 50% duty cycle signal at its inverting output, which AC signal is integrated by resistor 100 and C31 to provide a 0.5 volt DC signal at feedback node F. For night operation, this 0.5 volt DC signal at feedback node F may correspond to the nominal intensity of the lightbeam generated by apparatus 10 and 40.

During day operation, it may be desired that the beam intensity generated by apparatus 10 and 40 produce backscattered light to photodiode's PD2 to be a 90% duty cycle signal introducing a 4 millivolt peak-to-peak AC voltage signal at summation node 125. Amplifier U20 will provide a gain of 1000 to this signal to provide a 4 volt peak to peak AC voltage at its inverting output which when integrated by the integrator R100 and capacitor C31 at a 90% duty cycle will yield a 3.6 volt DC signal at feedback node F.

Now, in the case when the intensity of the light output from apparatus 10 and 40 falls 10% from that minimum beam intensity required for night operation, a corresponding 0.9 millivolt peak-to-peak AC signal having a 50% duty cycle will be generated a summation node 125, thereby providing a 0.9 volt peak-to-peak AC signal at the output of amplifier U20, and a 0.45 volt DC signal at the feedback node F. This 0.45 volt DC signal provided at the feedback node F is provided back to the non-inverting input of comparator U7 in FIG. 16A, and when sensed against the reference voltage provided to the inverting input of comparator U7 will generate a logic 1 signal on the non-inverting output thereof to Pin 79 of CPLD U1. The CPLD U1 using the algorithm, shown in FIG. 17, will thereby increase the duty cycle or the drive current to the LED array, thereby correspondingly increasing the duty cycle or current of the backscattered light sensed by photodiode's PD2. The detecting circuit 123 will responsively sense via the backscattered light of the increased light output of the apparatus 10 and 40 and sense the corresponding increase in the backscattered light. For instance, in the case where the beam intensity of the apparatus 10 and 40 fell 10% below the minimum intensity required by the DOT, the duty cycle of the drive voltage for the LED array may be increased 10% to a 55% duty cycle, such that the optical feedback circuit 123 will again provide a 0.5 volt DC signal at feedback node F which is sensed by comparator U10 thereby informing CPLD U1 that the beam light intensity output from apparatus 10 and 40 again meets the DOT minimum requirements.

In likewise operation, CPLD U1 will reduce the duty cycle or the drive current to the LED array slightly until the generated DC voltage signal at feedback node F is sensed by comparator U10 to fall below the reference voltage provided to the inverting input thereof. In this way, CPLD U1 responsively adjusts the duty cycle or drive current of the voltage signal driving the LED array such that the DC voltage provided at the feedback node F is slightly above the reference voltage provided to the inverting input of comparator U10.

Light apparatus 10 and 40 to present invention is adapted to provide different beam intensities depending on the ambient light that the traffic signal is operating in, which ambient light intensity is determined by photodiode's PD1 and circuit 120 as previously described. If CPLD U1 determines via circuit 120 day operation with high intensity ambient lightbeam sensed by photodiode PD1, the reference voltage provided to the inverting input of comparator U10 is increased to a second pre-determined threshold. CPLD U1 will provide a drive signal to transistor Q35 and LED drive circuit 130 with a sufficient duty cycle and drive current, increasing the beam intensity of the apparatus 10 and 40 until the feedback circuit 123 generates a DC voltage at feedback node F as sensed by comparator U10 corresponding to a reference voltage at the inverting input thereof.

Likewise, when the ambient detection photodiode PD1 and circuit 120 determines night operation, or maybe operation during a storm creating darker ambient light conditions, CPLD U1 will provide a second predetermined DC voltage reference to the inverting input of comparator U10. CPLD U1 reduces the duty cycle or drive current of the drive signal to LED circuit 130 until optical feedback circuit 123 is determined by comparator U10 to generate a DC voltage at node F corresponding to this reduced voltage reference signal corresponding to a darkened operation.

The optical feedback circuit 123 derives advantages in that backscattered light is sensed indicative of the pulsed generated light from the apparatus 10 and 40 to directly provide an indication of a generated light intensity therefrom. A plurality of photodiode's PD2 are provided in parallel having their outputs summed at summation node 125, whereby degradation or failure of one photodiode PD2 does not significantly effect the accuracy of the detection circuit. The optical feedback circuit 123 provides a DC voltage at feedback node F that directly corresponds to the sensed pulsed light, and which is not effected by the ambient light since the DC component generated by the photodiode's PD2 due to ambient light is filtered out. In this way, the optical feedback circuit 123 comprising detection circuit 122 accurately senses intensity of the pulsed lightbeam from the apparatus 10 and 40. CPLD U1 always insures an adequate and appropriate beam intensity is generated by apparatus 10 and 40 without overdriving the LED array, and while always meeting DOT requirements.

An LED drive circuit is shown at 130 serially interfaces LED drive signal data to drive circuitry of the LEDs 42 as shown in FIG. 16C.

Shown at 140 is another connector adapted to interface control signals from CPLD U1 to an initiation control circuit for the LEDs 42.

Each of the LEDs 42 is individually controlled by CPLD U1 whereby the intensity of each LED 42 is controlled by the CPLD U1 selectively controlling a drive current thereto, a drive voltage, or adjusting a duty cycle of a pulse width modulation (PWM) drive signal, and as a function of sensed optical feedback signals derived from the photodiodes as will now be described in reference to FIG. 17.

Figure 17:
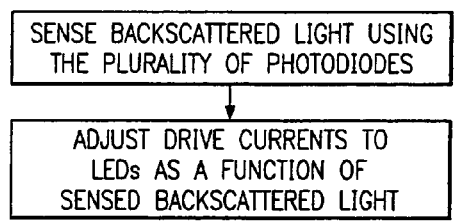
FIG. 17 is an algorithm depicting the sensing of ambient light and backscattered light to selectably provide a constant output of light.

Referring to FIG. 17 in view of FIG. 3, there is illustrated how light generated by solid state LED array 40 is diffused by diffuser 50, and a small portion 124 of which is back-scattered by the inner surface of Fresnel lens 72 back toward the surface of daughter board 60. The back-scattered diffused light 124 is sensed by photodiodes PD2, shown in FIG. 16. The intensity of this back-scattered light 124 is measured by circuit 122 and provided to CPLD U1. CPLD U1 measures the intensity of the ambient light via circuit 120 using photodiode PD1. The light generated by LEDs 42 is preferably distinguished by CPLD U1 by strobing the LEDs 42 using pulse width modulation (PWM) such as at a frequency of 1 KH2 to discern light generated by LEDs 42 from the ambient light (not pulsed).

Figure 16D:
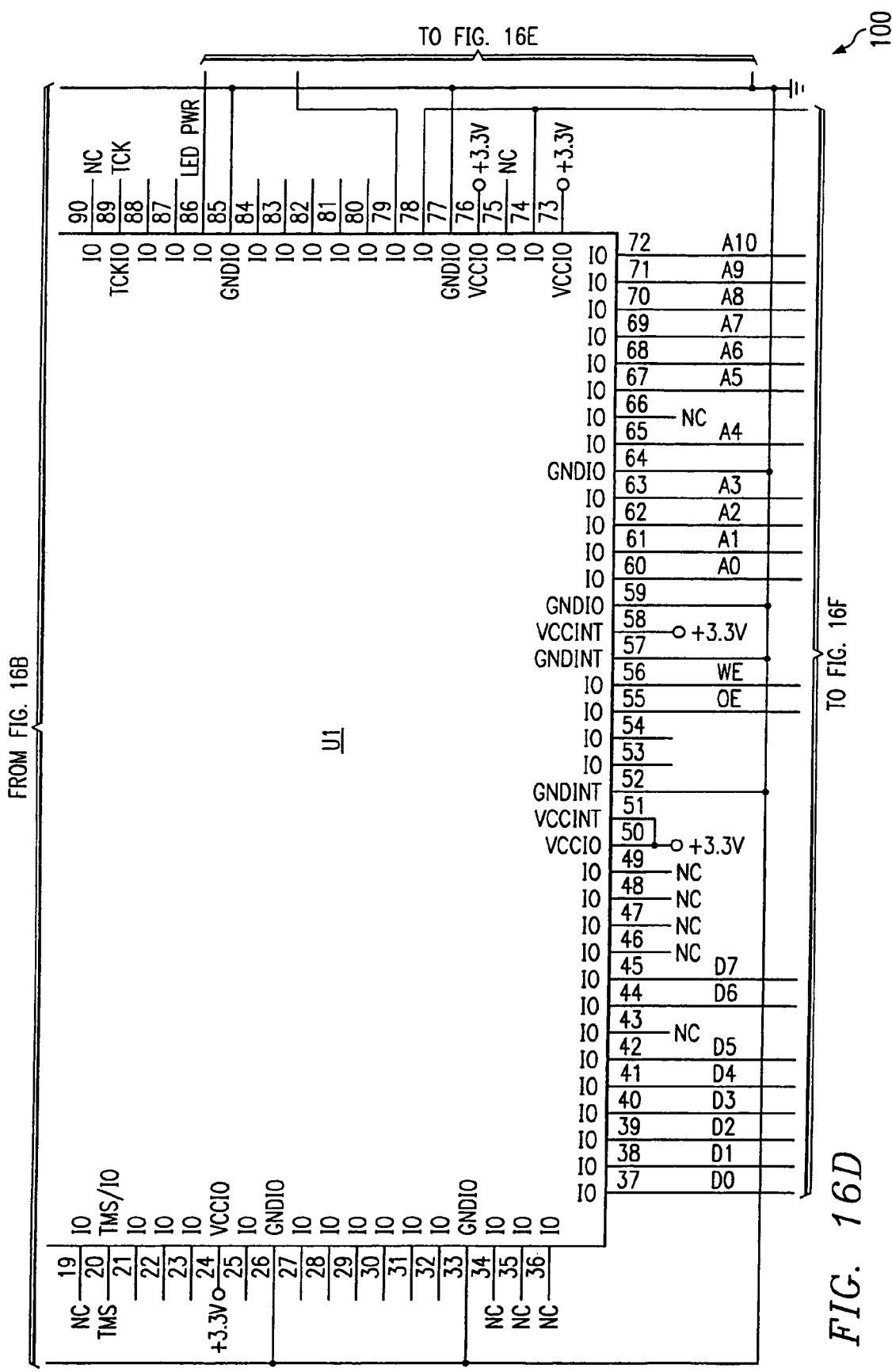

CPLD U1 individually controls the drive current, drive voltage, and PWM duty cycle to each of the respective LEDs 42 as a function of the light detected by circuits 120 and 122 as shown in FIG. 16D. For instance, it is expected that between 3 and 4% of the light generated by LED array 40 will back-scatter back from the Fresnel lens 72 toward to the circuitry 100 disposed on daughterboard 60 for detection. By normalizing the expected reflected light to be detected by photodiodes PD2 in circuit 122, for a given intensity of light to be emitted by LED array 40 through window 16 of lid 14, optical feedback is used to ensure an appropriate light output, and a constant light output from apparatus 10.

Figure 16E:
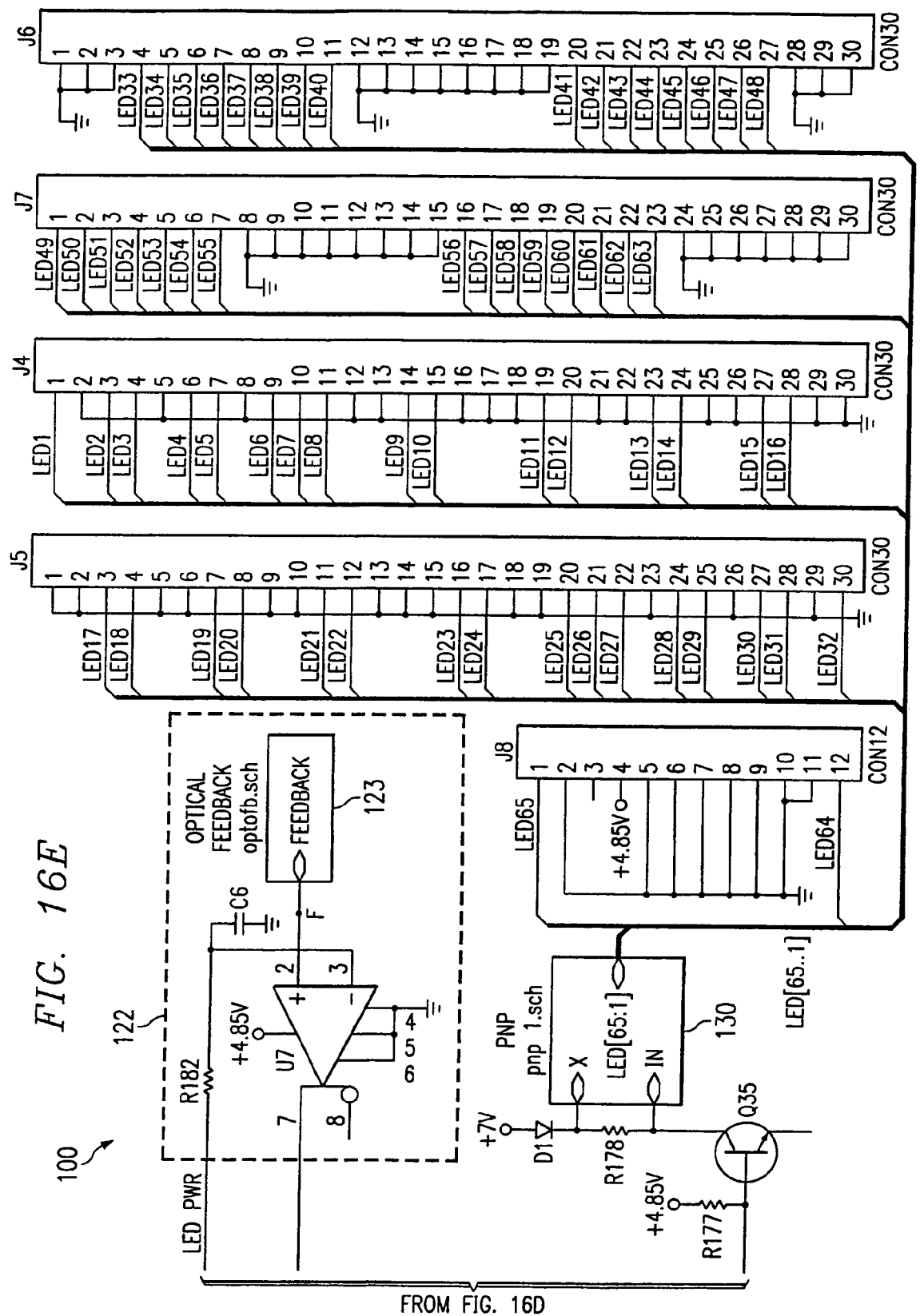
Figure 16F:
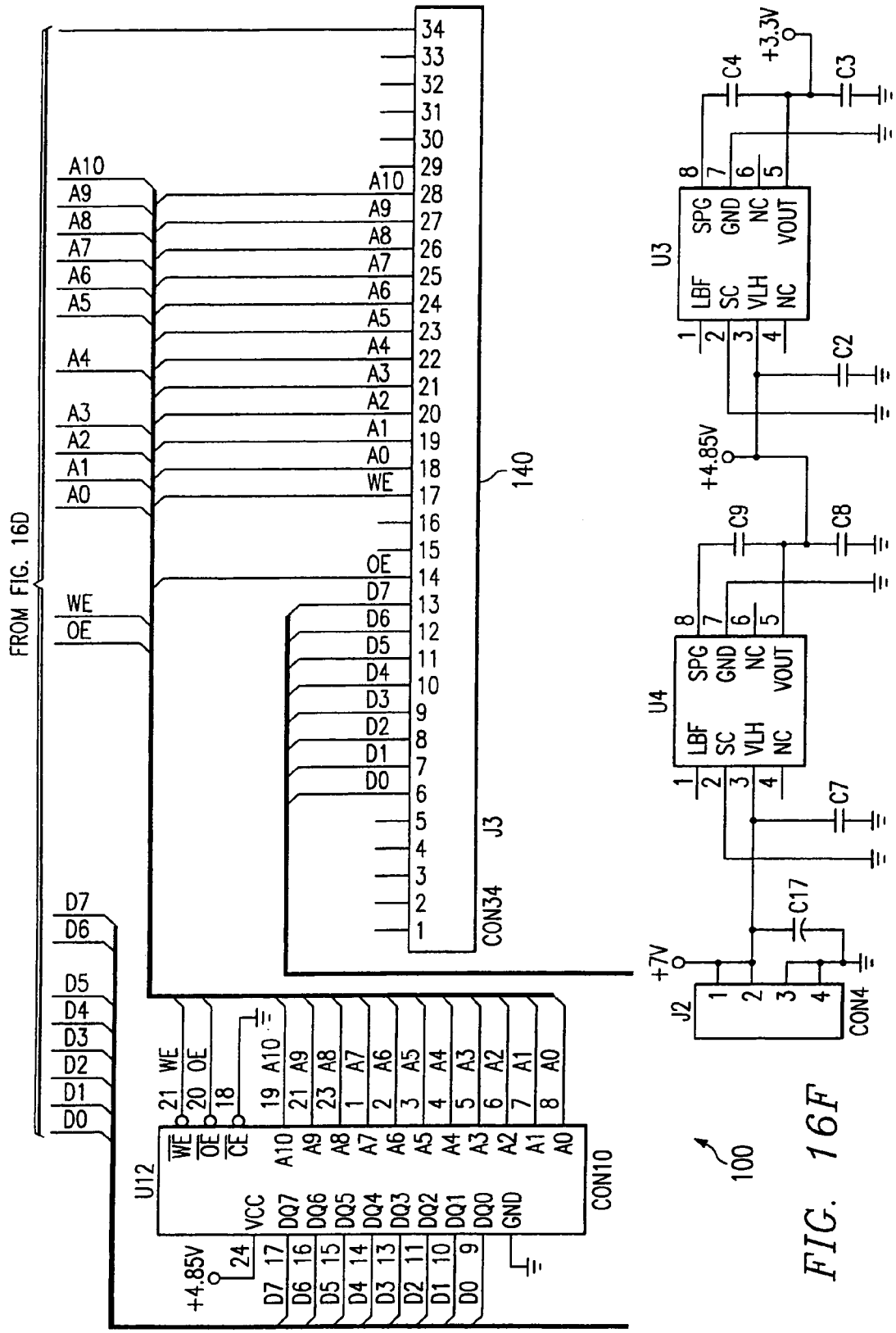
Figure 16G:
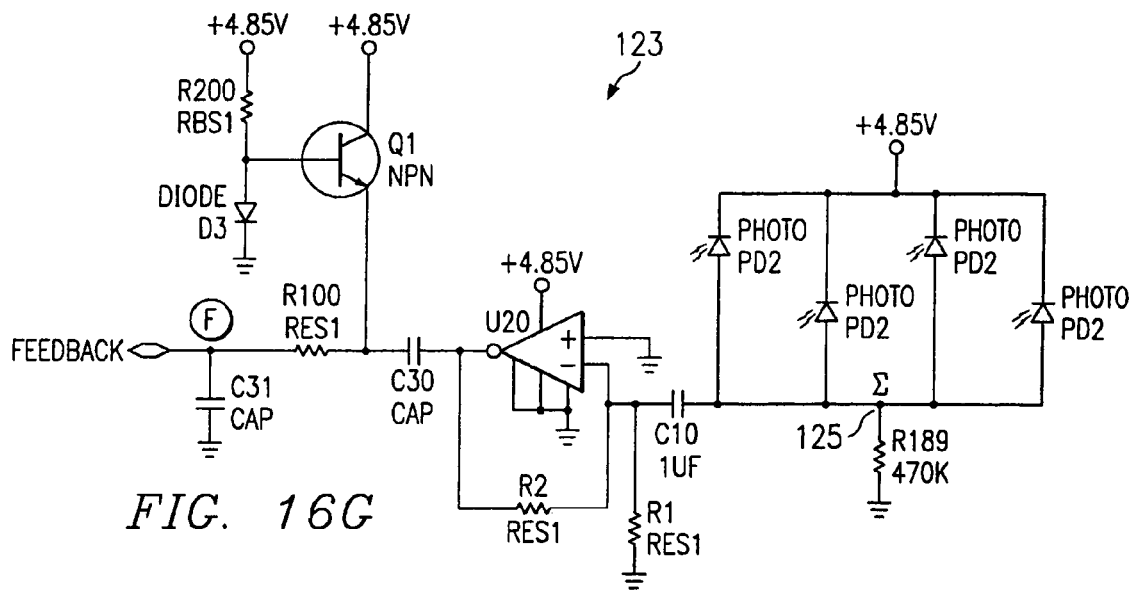
FIG. 16G is a schematic of the optical feedback circuit measuring the pulsed backscattered light from the Fresnel lens and providing an indicative DC voltage signal to the control electronics for maintaining an appropriate beams intensity.
Figure 16I:
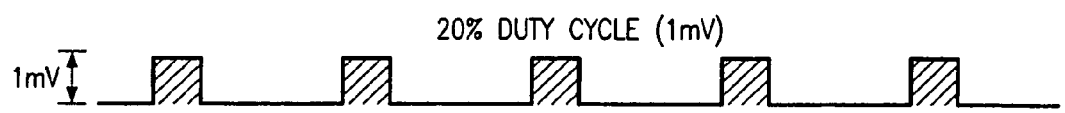
FIG. 16I–K illustrate the varying PWM duty cycles and above currents used to adjust the LED light output as a function of the optical feedback circuit.
Figure 16J:
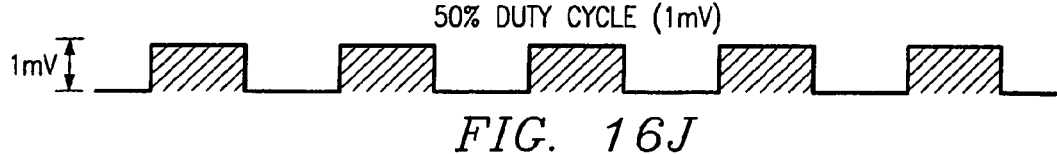
Figure 16K:
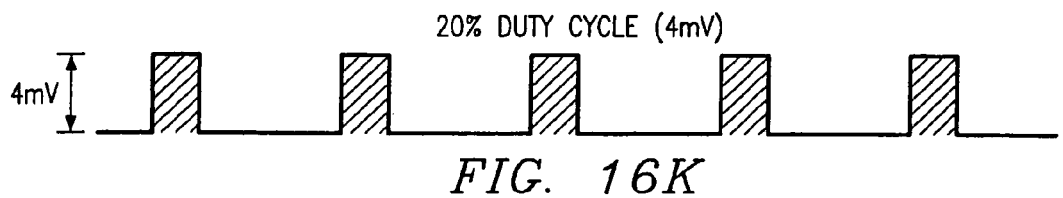
Figure 16H:
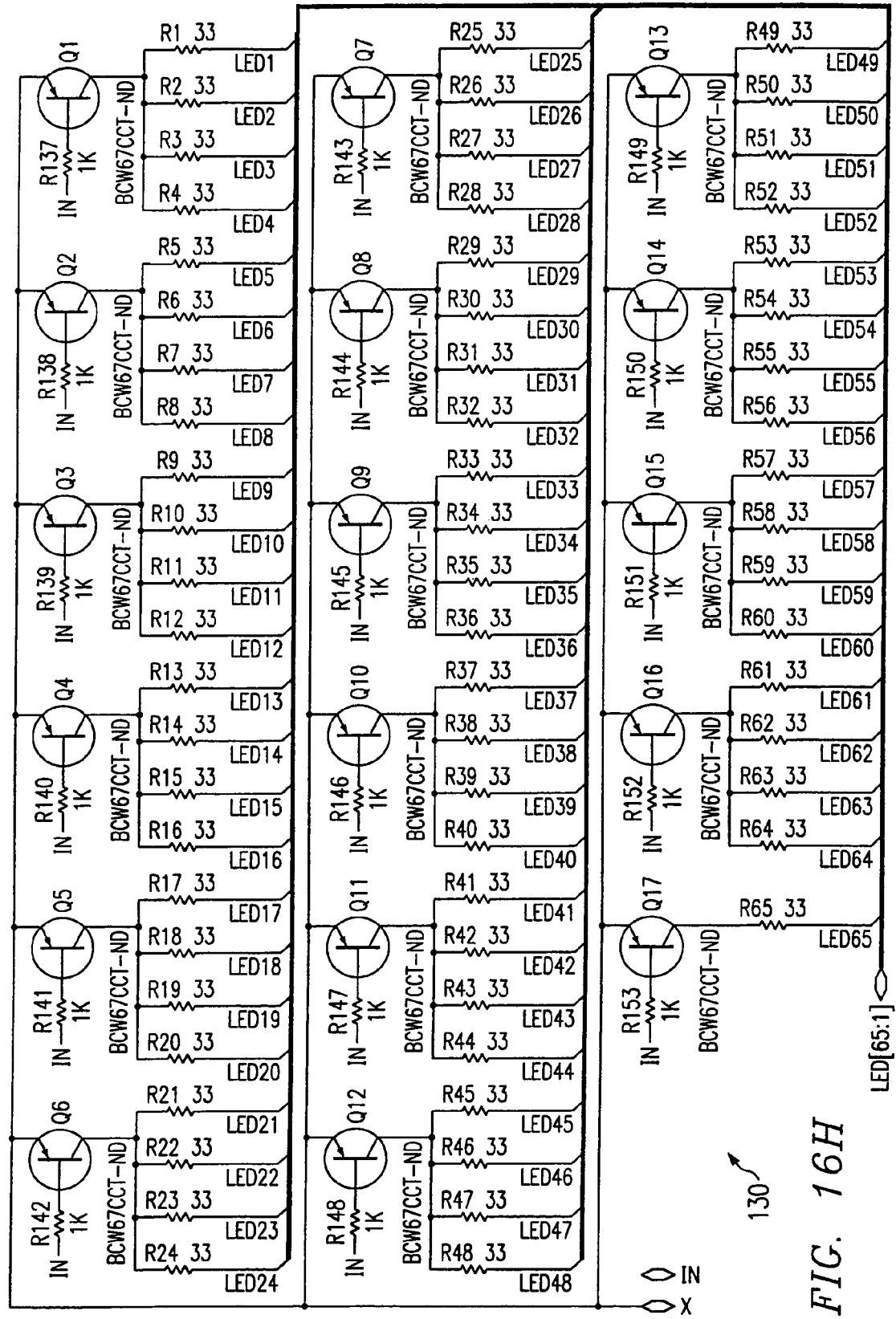
FIG. 16H is a schematic of the LED drive circuitry.

For instance, if the sensed back-scattered light, depicted as rays 124 in FIG. 3, is detected by photodiodes PD2 to fall about 2.5% from the normalized expected light to be sensed by photodiodes PD2, such as due to age of the LEDs 42, CPLD U1 responsively increases the drive current by increasing the PWM duty cycle, as shown in FIG. 16E, to the LEDs a predicted percentage, until the back-scattered light as detected by photodiodes PD2 is detected to be the normalized sensed light intensity. Alternatively, or in addition, the drive current to the LEDs can be reversed as shown in FIG. 16F. Thus, as the light output of LEDs 42 degrade over time, which is typical with LEDs, circuit 100 compensates for such degradation of light output, as well as for the failure of any individual LED to ensure that light generated by array 40 and transmitted through window 16 meets Department of Transportation (DOT) standards, such as a 44 point test. This optical feedback compensation technique is also advantageous to compensate for the temporary light output reduction when LEDs become heated, such as during day operation, known as the recoverable light, which recoverable light also varies over temperatures as well. Permanent light loss is over time of operation due to degradation of the chemical composition of the LED semiconductor material.

Preferably, each of the LEDs is driven by a pulse width modulated (PWM) drive signal, providing current during a predetermined portion of the duty cycle, such as for instance, 50%. As the LEDs age and decrease in light output intensity, and also during day operation due to daily temperature variations, the duty cycle and/or drive current may be responsively, slowly and continuously increased or adjusted such that the duty cycle and/or drive current until the intensity of detected light using photodiodes PD2 is detected by comparator U10 to be the normalized detected light for the operation, i.e. day or night, as a function of the ambient light. When the light sensed by photodiodes PD2 are determined by controller 60 to fall below a predetermined threshold indicative of the overall light output being below DOT standards, a notification signal is generated by the CPLD U1 which may be electronically generated and transmitted by an RF modem, for instance, to a remote operator allowing the dispatch of service personnel to service the light. Alternatively, the apparatus 10 can responsively be shut down entirely.

Figure 18B:
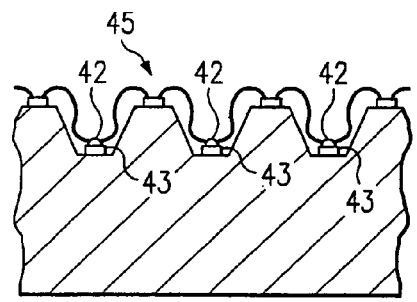
FIG. 18A and FIG. 18B are side sectional views of an alternative preferred embodiment including a heatsink with recesses, with the LEDs wired in parallel and series, respectively.
Figure 18A:
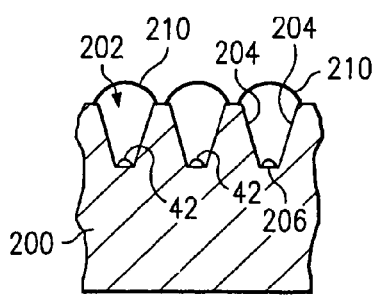

Referring now to FIG. 18A and FIG. 18B, there is shown an alternative preferred embodiment of the present invention including a heatsink 200 machined or stamped to have an array of reflectors 202. Each recess 202 is defined by outwardly tapered sidewalls 204 and a base surface 208, each recess 202 having mounted thereon a respective LED 42. A lens array having a separate lens 210 for each LED 42 is secured to the heatsink 200 over each recess 202, eliminating the need for a lens holder. The tapered sidewalls 206 serve as light reflectors to direct generated light through the respective lens 210 at an appropriate angle to direct the associated light to the diffuser 50 having the same surface area of illumination for each LED 42. In one embodiment, as shown in FIG. 18A, LEDs 42 are electrically connected in parallel. The cathode of each LED 42 is electrically coupled to the electrically conductive heatsink 200, with a respective lead 212 from the anode being coupled to drive circuitry 216 disposed as a thin film PCB 45 adhered to the surface of the heatsink 200, or defined on the daughterboard 60 as desired. Alternatively, as shown in FIG. 18B, each of the LEDs may be electrically connected in series, such as in groups of three, and disposed on an electrically non-conductive thermally conductive material 43 such as ceramic, diamond, SiN or other suitable materials. In a further embodiment, the electrically non-conductive thermally conductive material may be formed in a single process by using a semiconductor process, such as diffusing a thin layer of material in a vacuum chamber, such as 8000 Angstroms of SiN, which a further step of defining electrically conductive circuit traces 45 on this thin layer.

Figure 19:
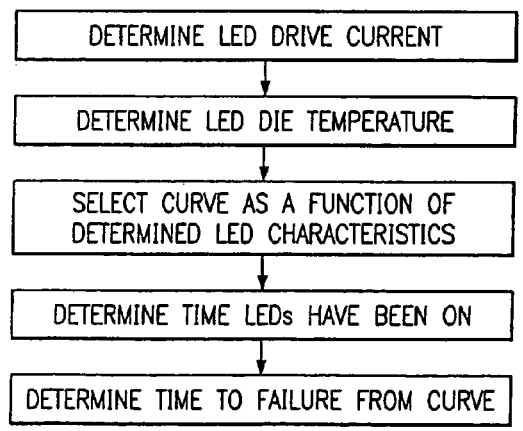
FIG. 19 is an algorithm depicting generating information indicative of the light operation, function and prediction of when the said state apparatus will fail or provide output below acceptable light output.

FIG. 19 shows an algorithm controller 60 applies for predicting when the solid state light apparatus will fail, and when the solid state light apparatus will produce a beam of light having an intensity below a predetermined minimum intensity such as that established by the DOT. Referring to the graphs in FIG. 20 and 21, the known operating characteristics of the particular LEDs produced by the LED manufacture are illustrated and stored in memory, allowing the controller 60 to predict when the LED is about the fail. Knowing the LED drive current operating temperature, and total time the LED as been on, the controller 60 determines which operating curve in FIG. 20 and FIG. 21 applies to the current operating conditions, and determines the time until the LED will degrade to a performance level below spec, i.e. below DOT minimum intensity requirements.

FIG. 22 depicts a block diagram of the modular solid state traffic light device. The modular field-replaceable devices are each adapted to selectively interface with the control logic daughterboard 60 via a suitable mating connector set. Each of these modular field replaceable devices 216 are preferably embodied as a separate card, with possibly one or more feature on a single field replaceable card, adapted to attach to daughterboard 60 by sliding into or bolting to the daughterboard 60. The devices can be selected from, alone or in combination with, a pre-emption device, a chemical sniffer, a video loop detector, an adaptive control device, a red light running (RLR) device, and an in-car telematic device, infrared sensors to sense people and vehicles under fog, rain, smog and other adverse visual conditions, automobile emission monitoring, various communication links, electronically steerable beam, exhaust emission violations detection, power supply predictive failure analysis, or other suitable traffic devices.

The solid state light apparatus 10 of the present invention has numerous technical advantages, including the ability to sink heat generated from the LED array to thereby reduce the operating temperature of the LEDs and increase the useful life thereof. Moreover, the control circuitry driving the LEDs includes optical feedback for detecting a portion of the back-scattered light from the LED array, as well as the intensity of the ambient light, facilitating controlling the individual drive currents, drive voltages, or increasing the duty cycles of the drive voltage, such that the overall light intensity emitted by the LED array 40 is constant, and meets DOT requirements. The apparatus is modular in that individual sections can be replaced at a modular level as upgrades become available, and to facilitate easy repair. With regards to circuitry 100, CPLD U1 is securable within a respective socket, and can be replaced or reprogrammed as improvements to the logic become available. Other advantages include programming CPLD U1 such that each of the LEDs 42 comprising array 40 can have different drive currents or drive voltages to provide an overall beam of light having beam characteristics with predetermined and preferably parameters. For instance, the beam can be selectively directed into two directions by driving only portions of the LED array in combination with lens 70 and 72. One portion of the beam may be selected to be more intense than other portions of the beam, and selectively directed off axis from a central axis of the LED array 40 using the optics and the electronic beam steering driving arrangement.

Referring now to FIG. 23, there is shown at 220 a light guide device having a concave upper surface and a plurality of vertical light guides shown at 222. One light guide 222 is provided for and positioned over each LED 42, which light guide 222 upwardly directs the light generated by the respective LED 42 to impinge the outer surface of the diffuser 54. The guides 222 taper outwardly at a top end thereof, as shown in FIG. 24 and FIG. 25, such that the area at the top of each light guide 222 is identical. Thus each LED 42 illuminates an equal surface area of the light diffuser 54, thereby providing a uniform intensity lightbeam from light diffuser 54. A thin membrane 224 defines the light guide, like a honeycomb, and tapers outwardly to a point edge at the top of the device 220. These point edges are separated by a small vertical distance D shown in FIG. 25, such as 1 mm, from the above diffuser 54 to ensure uniform lighting at the transition edges of the light guides 222 while preventing bleeding of light laterally between guides, and to prevent light roll-off by generating a homogeneous beam of light. Vertical recesses 226 permit standoffs 52 extending along the sides of device 220 (see FIG. 3) to support the peripheral edge of the diffuser 54.

Figure 26:
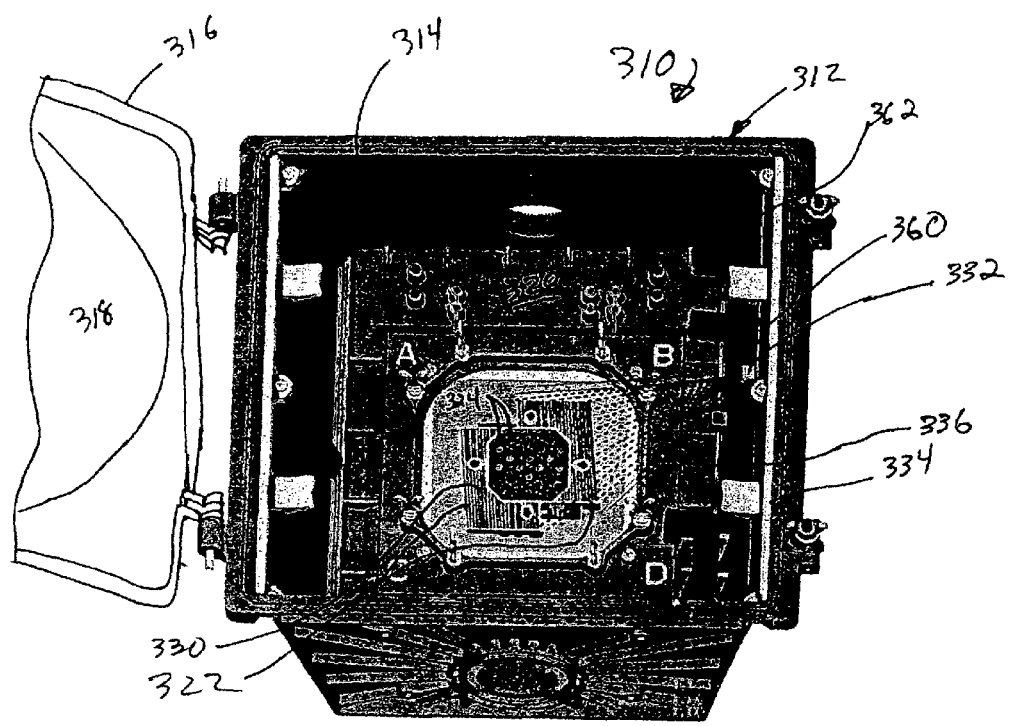
FIG. 26 is a top view of a traffic signal light according to yet another preferred embodiment of the present invention, whereby incoming ambient light is focused by the traffic signal front lens onto a reflector disposed proximate the solid state LEDs, the reflector reflecting and redirecting the incoming ambient light to a photodetector disposed on the side wall of the traffic light housing.

Referring now to FIG. 26, there is generally shown at 310 a traffic signal light according to another preferred embodiment of the present invention. Traffic signal light 310 is seen to be comprised of a rectangular housing 312 defining a cavity 314 therein and having a hinged lid 316 securingly receiving a front lens 318. Disposed on a rear surface 320 of housing 312 is seen a reflector 322 encompassing a plurality of LEDs 324 which generate a lightbeam during operation of the light 310. Reflector 322 is seen to include a plurality of parallel angled mirrored surfaces generally shown at 330, which surfaces are precisely defined and positioned in housing 312 so as to further direct incident ambient light from lens 318 to a photodetector 332 defined on a sidewall 334 of housing 312.

Figure 27:
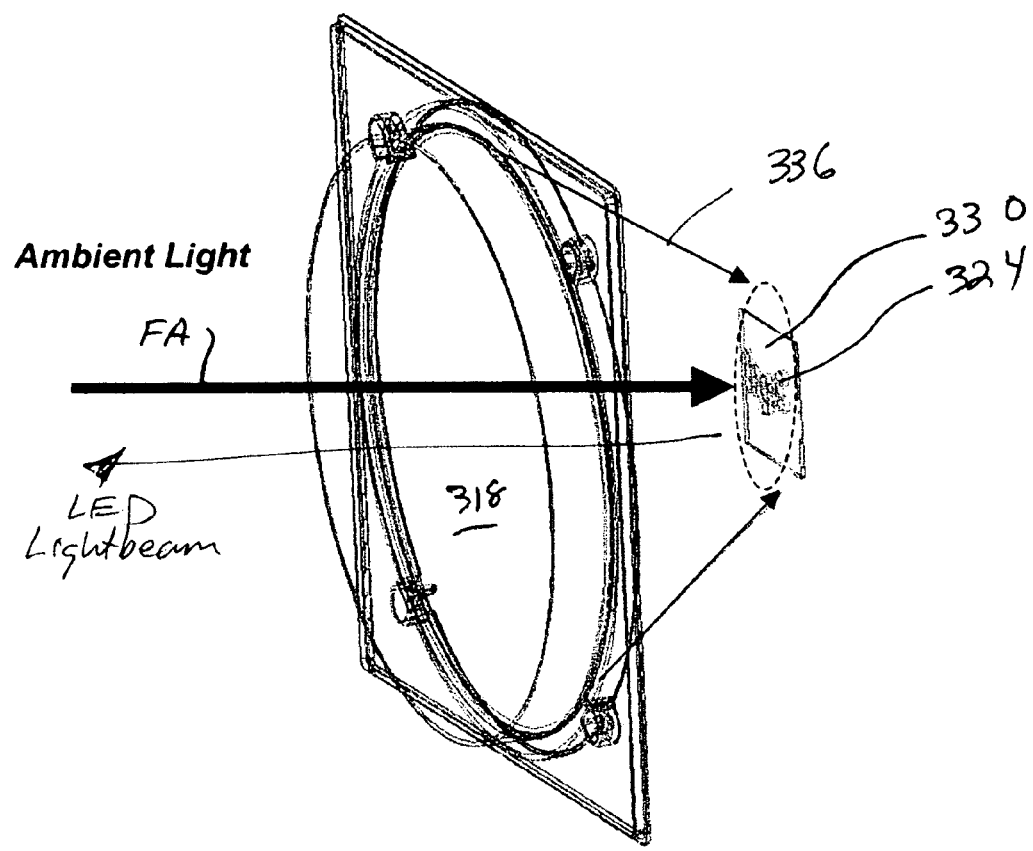
FIG. 27 is a side view of the traffic signal light of FIG. 26 depicting the ambient light being focused by the traffic signal front lens to overfill the reflector.

Advantageously, a single common lens 318 is used to both transmit the lightbeam generated by LEDs 324, and also to focus the incident ambient light to overfill the angled mirrored surfaces 330, as depicted in FIG. 27. The angled surfaces 330 are defined along the focal axis (FA) of lens 318, and each surface 330 reflects and redirects the incident ambient light focused by lens 318 to the photodetector 332 on the sidewall 334, as shown in FIG. 26. Directing the incident ambient light laterally to the sidewall achieves technical advantages in that ambient light is directed out of the path of the lightbeam generated by the LEDs 324 so as to reduce and/or eliminate visual artifacts, and conserve space in the housing 312.

The exact position of the photodetector 332 and the angles of the mirrored surfaces 330 of the reflector 322 are not critical. Since the ambient light is reflected in the focal plane of lens 318, the photodetector 332 and sidewall 334 effectively appear to be some distance behind the focal plane of lens 318. The redirected ambient light will fill a significant portion of sidewall 334 and will overfill photodetector 332. The portion of light that impinges on photodetector 332 is represented by light cone 336 and can be of sufficient strength to provide reasonable information to the integrated controller.

Figure 28:
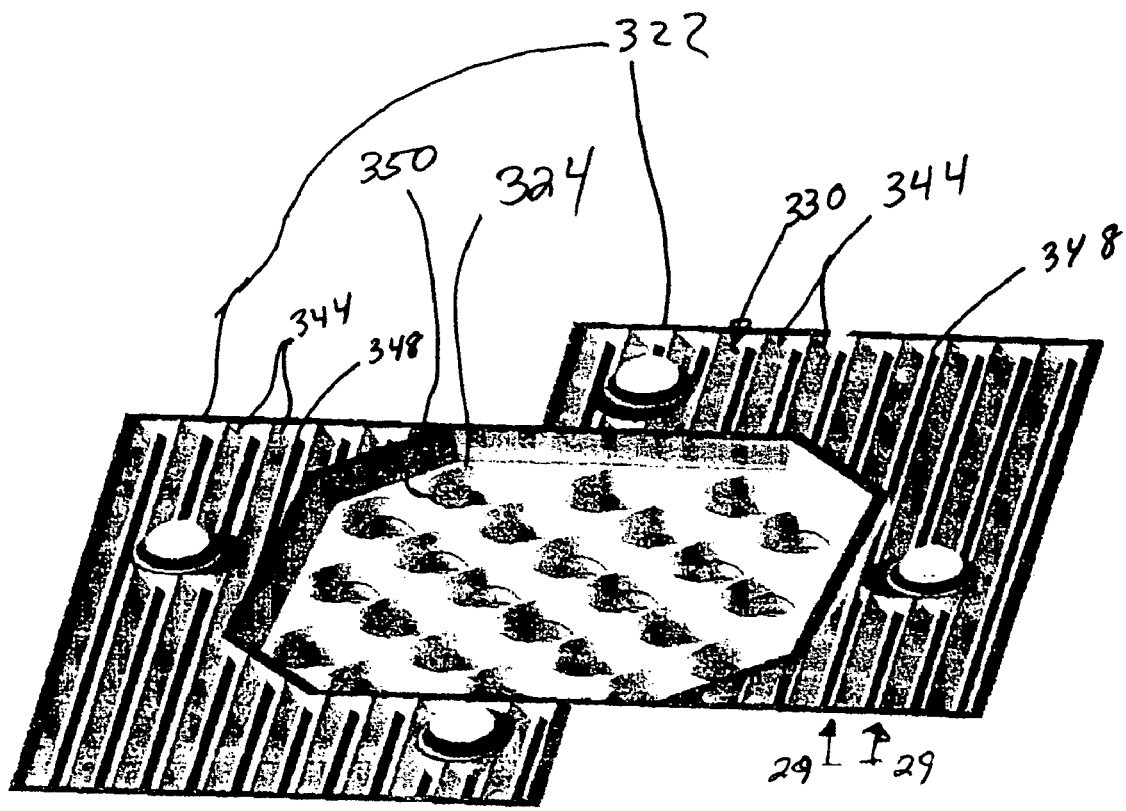
FIG. 28 is an enlarged perspective view of the reflector being segmented to define a plurality of parallel angled mirrored surfaces.

Referring now to FIG. 28 there is depicted an enlarged view of the reflector 322 having the plurality of elongated, parallel angled mirrored surfaces generally shown at 330. As shown, a plurality of centrally located openings 350 are defined through a central portion of the reflector 322 and secure therewithin the respective LEDs 324.

Figure 29:
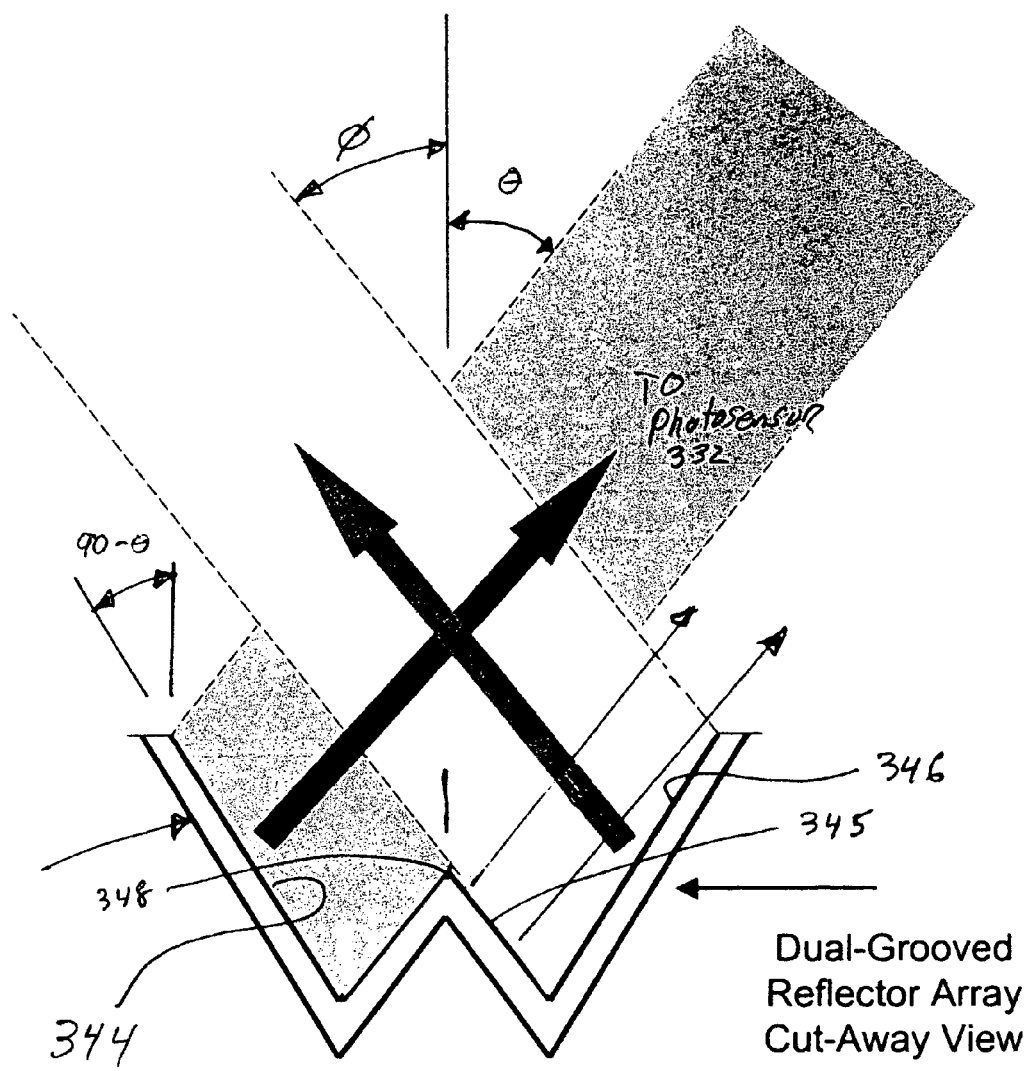
FIG. 29 is a cross-sectional view taken along line 29—29 in FIG. 28 of the reflector illustrating the reflector having a plurality of angled mirror surfaces.

FIG. 29 shows a cross section of a mirror segment taken along line 33—33 in FIG. 28, depicting the plurality of angled surfaces 330 being comprised of a first set of light reflecting surfaces 344 facing a first direction θ with respect to the normal of the reflector, and a second set of light reflecting surfaces 346 facing an angle φ with respect to the normal. The first set of mirrored surfaces 344 are separated from the corresponding second set of surfaces 346 by a raised apex portion 348 and together generally define a "W" shape mirror section. When the reflector 322 is positioned in the housing 312, as shown in FIG. 26, the incident ambient light focused by lens 318 is collectively reflected by the first angled surfaces 344 towards the photodetector 332. Minor mirrored surfaces 345 also reflect incident ambient light toward photodetector 332 where opposing mirror 346 does not block same.

Advantageously, these first set of mirrored surfaces 344 and minor mirror surfaces 345 direct the incident ambient light to the photodetector 332 for sensing, and are positioned about LEDs 324 such that the lens 318 transmits and focuses the lightbeam, and also focuses the incident ambient light.

Figure 30:
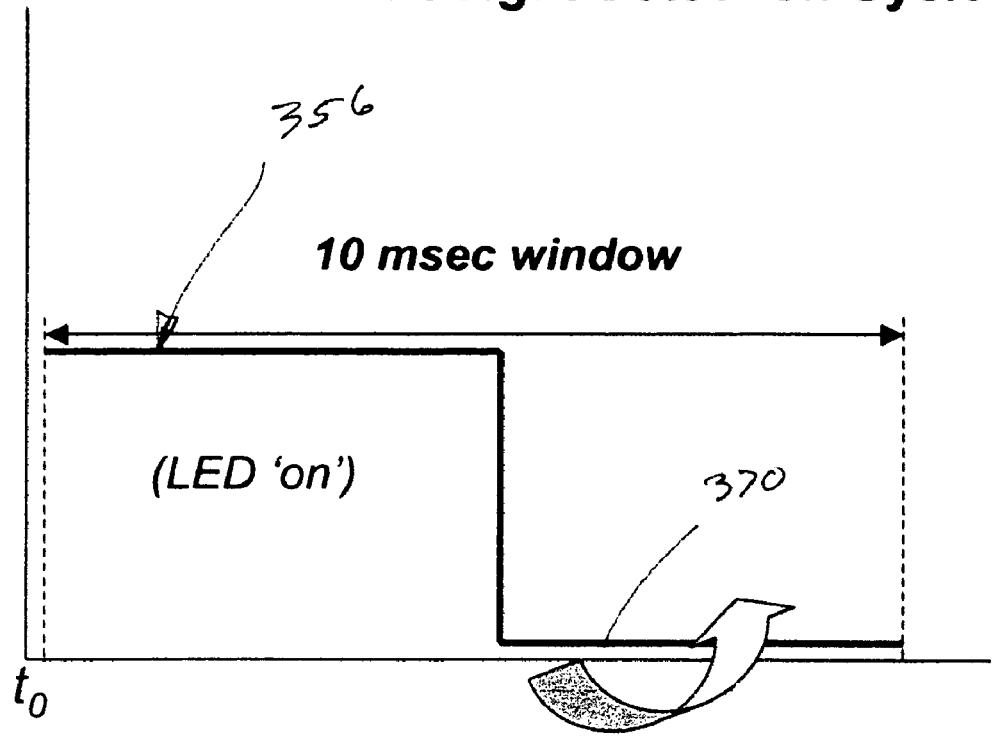
FIG. 30 is a graph depicting the LED light source being pulse width modulated, whereby the controller obtains the ambient light from the photodetector while the LEDs generating a lightbeam are off.

Referring now to FIG. 30, there is shown a graph 356 of the pulse width modulation of the LEDs 324, whereby an integrated controller 360 disposed on a circuit board 362 reads the output of photodetector 332 to ascertain the incident ambient light while the LEDs 324 are in the "off" state, as shown at 370. As shown in FIG. 26, integrated controller 360 and photodetector 332 reside on the same circuit board 362 disposed on sidewall 334 of housing 312. Integrated controller 360 controls the LEDs such that the LEDs are generating a collective lightbeam with a duty cycle ranging from between 10% to 95%, at over 100 Hertz. The ambient light is sensed by photodetector 322 during the window that the LEDs are not on, shown at 370, such that the LEDs 324 do not contribute any stray light during the sensing of the incident ambient light.

Traffic light 310 is preferably operated in three modes, a day mode, a night mode, and a bright sun mode. Advantageously, the ambient light is sensed by photodetector 332 when the LEDs 324 are in the "off" mode, to detect the incident ambient light in each of these modes. Integrated controller 360 responsively establishes the intensity of the lightbeam generated by LEDs 324 so as to produce a lightbeam intensity suitable for the mode of operation. For instance, the output beam generated by the LEDs is stronger in the bright sun mode than the day mode to meet DOT requirements during operation. The light output is controlled by integrated controller 360 to have a reduced output during the night mode. Integrated controller 360 responsively adjusts the lightbeam output created by LEDs 324 in incremental steps over a time period, such as to not adjust the lightbeam output when photodetector 332 outputs signal spikes or troughs when ambient light momentarily varies, such as photodetector 332 sensing automobile headlights or lightning.

Figure 31:
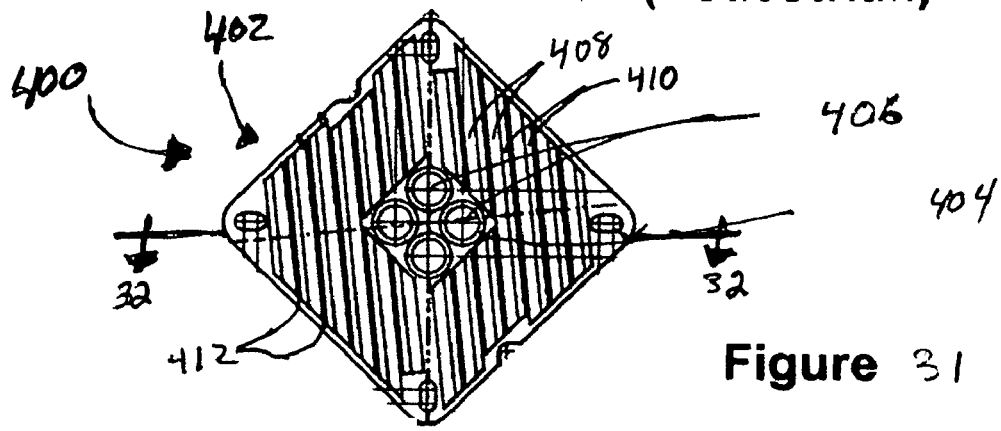
FIG. 31 is a top view of a modified reflector utilized in a pedestrian head signal.
Figure 32:
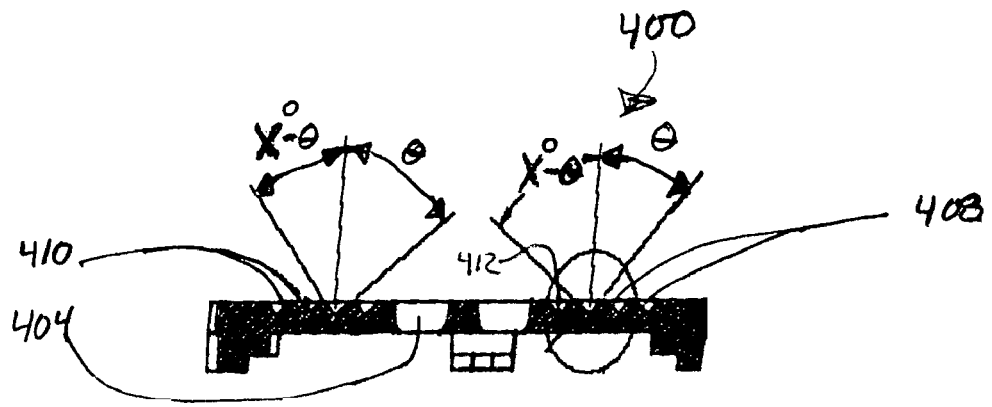
FIG. 32 is a cross-sectional view taken along line 32—32 in FIG. 31.
Figure 33:
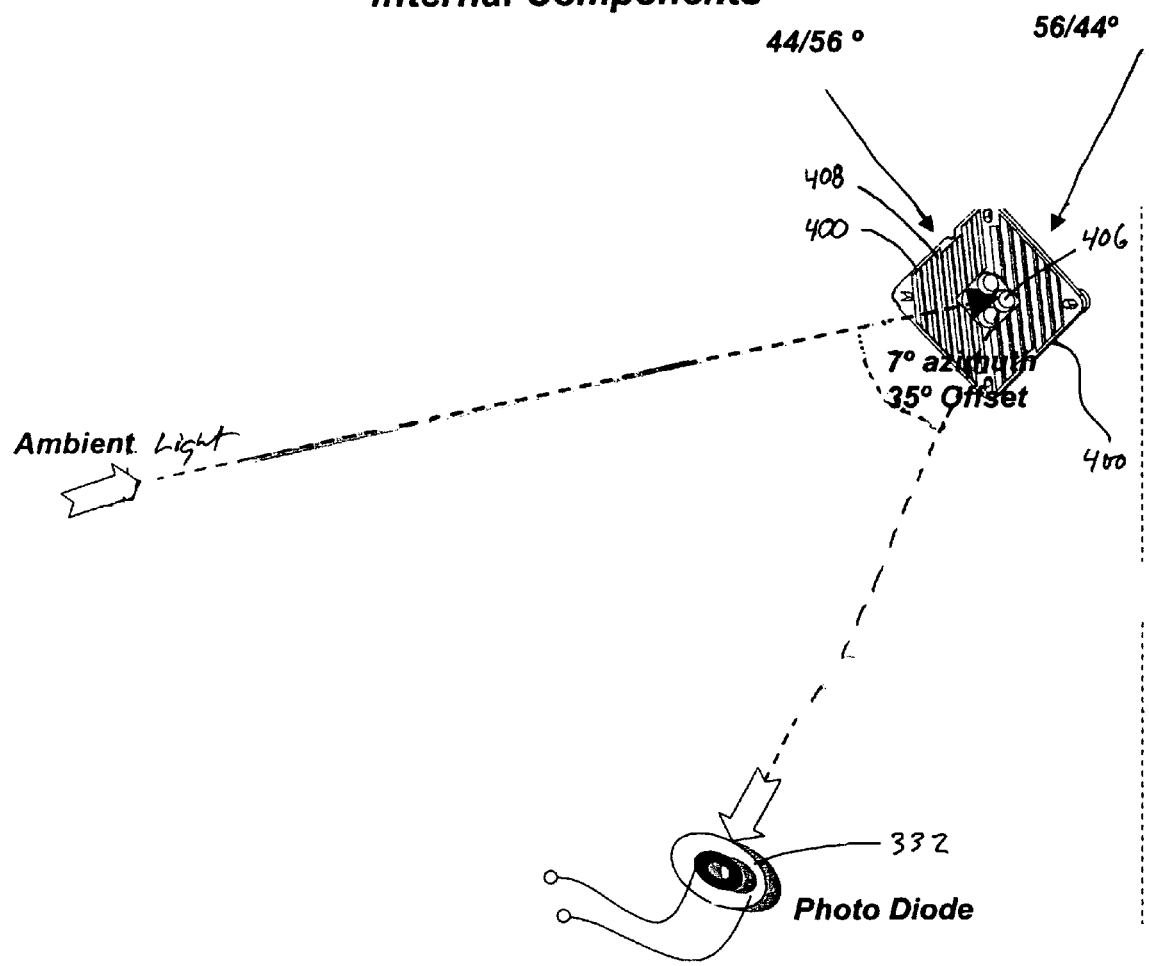
FIG. 33 depicts ambient light being reflected by the reflector of FIG. 31 to a photodetector.

FIG. 31 depicts a reflector 400 according to another embodiment utilized in a pedestrian signal, seen to have a plurality of mirrored surfaces generally shown at 402 and central openings 404 receiving LEDs 406. A cross-sectional view of reflector 400 is shown in FIG. 32, taken along lines 36—36 in FIG. 31, depicting a first set of mirrors 408, and a second angled mirror set 410. The mirrored sets 408 and 410 are defined and separated by serrations 412. As shown, the mirrored surfaces 408 are parallel to one another, and are skewed slightly from a central axis of the reflector 400 to define an azimuth, and an offset when positioned in housing 312 as shown in FIG. 33.

Figure 34:
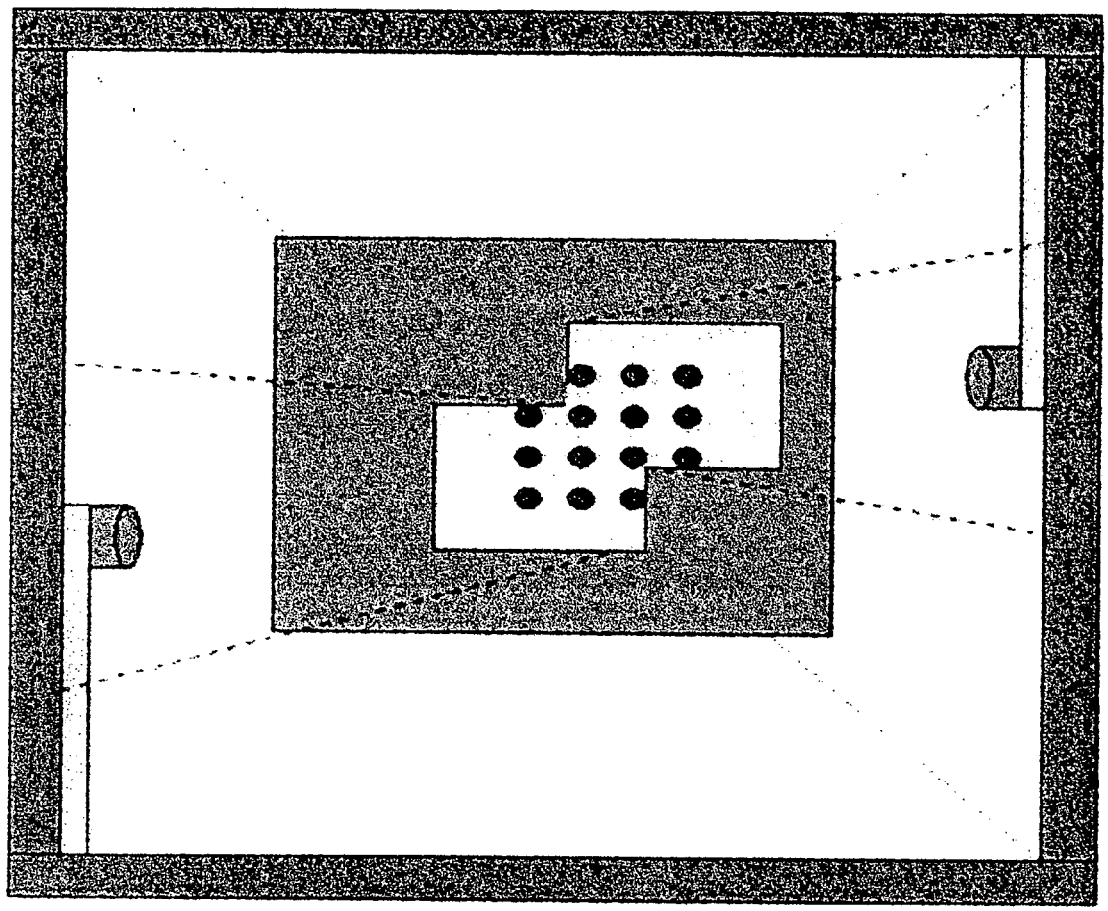
FIG. 34 is a top view of another embodiment of the present invention comprising bi-modal integrated controllers with optical photo detectors.

Referring now to FIG. 34, there is shown a top view of another embodiment of the present invention seen to comprise of bi-modal integrated controllers with optical photo detectors. Such an embodiment is used for a single left turn arrow signal that can represent both green and yellow at different times. One integrated controller is designed to power the green LEDs on the LED board and the other integrated controller is designed to power the yellow LEDs on the LED board. As shown in FIG. 29, the dual-grooved reflector design uses mirrored surface 344 to direct light towards one photodetector and mirrored surface 346 to direct light towards the other photodetector.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A traffic light, comprising:
   a lens;
   a solid state light source adapted to generate a lightbeam through the lens;
   at least one photodetector adapted to receive incident ambient light directed through and focused by the lens; and
   a reflector adapted to direct the incident ambient light to the photodetector.

2. The traffic light as specified in claim 1, wherein the reflector has a plurality of angled reflective surfaces.

3. The traffic light as specified in claim 2, wherein the reflective surfaces are substantially parallel to one another.

4. The traffic light as specified in claim 2, wherein the reflector is serrated to define the plurality of reflective surfaces.

5. The traffic light as specified in claim 1, wherein the focused ambient light overfills the reflector.

6. The traffic light as specified in claim 1, wherein the focused ambient light is completely focused on the reflector.

7. The traffic light as specified in claim 1, wherein focused ambient light is reflected by the reflector in 2 directions with respect to a normal of the reflector.

8. The traffic light as specified in claim 1, wherein the traffic light further comprises a housing having a first surface and a second surface, the first surface supporting the reflector and the second surface supporting the photodetector.

9. The traffic light as specified in claim 8, wherein the first surface is a bottom surface, and the second surface is a sidewall.

10. The traffic light as specified in claim 1, wherein the solid state light source is disposed proximate the reflector.

11. The traffic light as specified in claim 10 wherein the reflector encompasses the solid state light source.

12. The traffic light as specified in claim 10, wherein the lens directs the incident ambient light to proximate the light source.

13. The traffic light as specified in claim 1 further comprising an integrated controller selectively controlling the light source, wherein the integrated controller responds to the photodetector when the light source is off.

14. The traffic light as specified in claim 13, wherein the integrated controller adjusts the lightbeam intensity as a function of the photodetector sensing the incident ambient light.

15. The traffic light as specified in claim 13, wherein the integrated controller pulse width modulates (PWM) the light source.

16. A method of operating a traffic light, comprising the steps of:
    generating a lightbeam using a solid state light source and a lens transmitting the lightbeam;
    focusing and reflecting incident ambient light transmitted through the lens to a photodetector; and
    establishing the intensity of the generated lightbeam as a function of the reflected incident ambient light sensed by the photodetector.

17. The method as specified in claim 16 further comprising the step of directing the focused ambient light to proximate the light source.

18. The method as specified in claim 16 further comprising the step of the photodetector sensing the incident ambient light when the solid state light is selectively not generating the lightbeam.

19. The traffic light as specified in claim 18, wherein focused ambient light is reflected by the reflector in 2 directions with respect to a normal of the reflector.

20. The method as specified in claim 16 further comprising the step of using a reflector to direct the incident ambient light to the photodetector.

21. The traffic light as specified in claim 20, wherein the reflector has a plurality of angled reflective surfaces.

22. The traffic light as specified in claim 21, wherein the reflective surfaces are substantially parallel to one another.

23. The traffic light as specified in claim 21, wherein the reflector is serrated to define the plurality of surfaces.

24. The traffic light as specified in claim 20, wherein the focused ambient light overfills the reflector.

25. The traffic light as specified in claim 20, wherein the focused ambient light is completely focused on the reflector.

26. The traffic light as specified in claim 20, wherein the traffic light further comprises a housing having a first surface and a second surface, the first surface supporting the reflector and the second surface supporting the photodetector.

27. The traffic light as specified in claim 26, wherein the first surface is a bottom surface, and the second surface is a sidewall.

28. The traffic light as specified in claim 20, wherein the solid state light source is disposed proximate the reflector.

29. The traffic light as specified in claim 20, wherein the reflector encompasses the solid state light source.

30. The traffic light as specified in claim 20, wherein the lens directs the incident ambient light to proximate the light source.

31. The traffic light as specified in claim 16 further comprising the step of using an integrated controller to selectively control the light source, wherein the integrated controller responds to the photodetector when the light source is off.

32. The traffic light as specified in claim 31, further comprising the step of the integrated controller adjusting the lightbeam intensity as a function of the photodetector sensing the incident ambient light.

33. The traffic light as specified in claim 31, wherein the integrated controller pulse width modulates (PWM) the light source.

* * * * *